(12) United States Patent
Bickle et al.

(10) Patent No.: US 8,719,813 B2
(45) Date of Patent: *May 6, 2014

(54) OPTIMIZED SCA CORBA DESCRIPTOR FOR SCA CORBA DESCRIPTOR FILES

(75) Inventors: Gerald L. Bickle, Columbia City, IN (US); Susan J. Silver, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/373,761

(22) Filed: Nov. 29, 2011

(65) Prior Publication Data

US 2013/0139146 A1 May 30, 2013

(51) Int. Cl.
*G06F 9/445* (2006.01)
*G06F 9/45* (2006.01)

(52) U.S. Cl.
USPC ........... 717/174; 717/136; 717/137; 717/140; 717/143

(58) Field of Classification Search
None
See application file for complete search history.

(56) References Cited

U.S. PATENT DOCUMENTS

| | | | |
|---|---|---|---|
| 6,737,992 B1 | 5/2004 | Wolthuis | |
| 7,017,140 B2 | 3/2006 | Haji-Aghajani et al. | |
| 7,039,597 B1 * | 5/2006 | Notani et al. | 705/7.13 |
| 7,151,925 B2 | 12/2006 | Ting et al. | |
| 7,367,020 B2 | 4/2008 | Bickle et al. | |
| 7,487,493 B1 | 2/2009 | Faulkner | |
| 7,680,515 B2 | 3/2010 | Cho et al. | |
| 7,689,207 B2 | 3/2010 | Hinterberger et al. | |
| 7,784,029 B2 | 8/2010 | Hassan et al. | |
| 7,882,506 B2 | 2/2011 | Chacko et al. | |
| 7,954,108 B2 | 5/2011 | Paniscotti et al. | |
| 2002/0046294 A1 * | 4/2002 | Brodsky et al. | 709/246 |
| 2002/0099738 A1 | 7/2002 | Grant | |
| 2003/0114163 A1 | 6/2003 | Bickle et al. | |
| 2004/0078788 A1 | 4/2004 | Wong | |
| 2004/0221292 A1 * | 11/2004 | Chiang et al. | 719/310 |
| 2007/0061820 A1 | 3/2007 | Chacko et al. | |
| 2007/0078924 A1 * | 4/2007 | Hassan et al. | 709/200 |
| 2008/0109828 A1 | 5/2008 | Cho et al. | |
| 2010/0070524 A1 * | 3/2010 | Bae et al. | 707/769 |
| 2010/0185541 A1 * | 7/2010 | Hassan et al. | 705/34 |
| 2010/0242020 A1 * | 9/2010 | Cho et al. | 717/120 |
| 2010/0313197 A1 * | 12/2010 | Cho et al. | 717/174 |

OTHER PUBLICATIONS

"JPEO JTRS initiates the development of a new Software Communications Architecture (SCA) Release," Aug. 18, 2009.*

(Continued)

*Primary Examiner* — Insun Kang
(74) *Attorney, Agent, or Firm* — Daly, Crowley, Mofford & Durkee, LLP

(57) ABSTRACT

A preparsers tool is provided for converting Software Communications Architecture (SCA) Extensible Markup Language (XML) files into Common Object Request Broker Architect (CORBA) structures usable by a Software Communications Architect (SCA) Core Framework (CF). The preparsers tool retrieves a set of target environment implementation definitions (TEID) that define at least one characteristic of a target environment to which a CORBA Common Data Representation (CDR) file is provided. For each component in the target environment, one or more dependencies are merged into an implementation device dependencies list that comprises visible device dependencies and external device dependencies. The parsed set of XML files is converted into a CORBA structure type, the conversion based at least in part on the TEID, such that the conversion of the parsed set of XML files results in a CORBA structure having a type and precedence order that is correct for the target environment.

20 Claims, 21 Drawing Sheets

(56) References Cited

OTHER PUBLICATIONS

Gonzalez et al., "Open-Source SCA-Based Core Framework and Rapid Development Tools Enable Software-Defined Radio Education and Research," IEEE, 2009.*
Gonzalez et al., "Design and Implementation of an SCA Core Framework for a DSP Platform," Citeseerx, 2007.*
Bicer, "A Software Communications Architecture Compliant Software Defined Radio Implementation," Jun. 2002.*
Gonzalez, "Design and Implementation of an Efficient SCA Framework for Software-Defined Radios," May 2006.*
U.S. Appl. No. 13/068,061, filed May 2, 2011.
U.S. Appl. No. 13/271,412, filed Oct. 12, 2011.
Notification of International Search Report of the International Searching Authority for PCT/US2002/24042, dated Jan. 24, 2003, 4 pages.
U.S. Pat. No. 7,367,020, issued Apr. 29, 2008, U.S. Appl. No. 10/207,315, filed Jul. 29, 2002.
Letter from FA dated Feb. 5, 2012 with Office Action from Israel Patent Office for PCT/US2002/24042, dated Oct. 13, 2010, 6 pages.
Aguayo et al., "Design and Implementation of an SCA Core Framework for a DSP Platform", Proceedings of the SDR '09 Technical Conference and Product Exposition (2009), 6 pages, http://www.sdrforum.org/pages/sdr06/sdr06_papers/2.4/2.4-2.pdf.
Bernier et al., "SCA Advanced Features—Optimizing Boot Time, Memory Usage, and Middleware Communications", Proceedings of the SDR '09 Technical Conference and Product Exposition (SDR Forum 2009), 8 pages, http://data.memberckicks.com/site/sdf/sdr09-1569202633.pdf.
Bickle, Jerry, "Next Generation SCA Operating Environments", Proceeding of the SDR 06 Technical Conference and Product Exposition, PrismTech Corp., Burlington, MA, 5 pages, 2006.
"Building Distributed Applications with CORBA and XML", Sep. 30, 2010, http://xml.sys-con.com/node/40033/print, SYS-CON Media Inc., 6 pages.
Cruz et al., "An Approach to a Compact JTRS SCA Core Framework for Handheld Radios", Proceedings of the SDR '02 Technical Conference and Product Exposition (SDR Forum 2002), 8 pages.
Dohse et al., "General Dynamics C4 Systems Optimized CORBA to Meet SDR Requirements", Jul. 15, 2004, 12 pages.
Friedman et al., "A Case for Efficient Portable Serialization in CORBA (Preliminary Version)", Technion Technical Report CS-2005-18—2005.
Hayes, Neli "Software Communcations Architecture", OMG Workshop on Distributed Object Computing for Real-Time and Embedded Systems, Jul. 2003, The Boeing Company, Anaheim, CA, 226 pages.
"Joint Program Executive Office Joint Tactical Radio System", CORBA Neutral Representation, Dec. 2, 2010, JTRS SCA Working Group, JPEO JTRS, 9 pages.
Linn, Charles A, "A Simple, Lightweight Communications Architecture Facilitating SCA Application Portability", Proceedings of the SDR '09 Technical Conference and Product Exposition (2009), 6 pages.
"OMG SBC Workshop: Realizing the Vision SCA Evolution and Standardization", Presented by Jerry Bickle, Mar. 7, 2007, PrismTech Productivity Toosl and Middleware, 24 pages.
Paniscotti et al., "Next-Generation SDR Operating Environment Takes on Swap Challenges in Resource-Constrained Platforms", Trends in SDR and Reconfigurable Computing, PrismTech Corp., Burlington, MA, www.prismtech.com, 3 pages, Military Embedded Systems Jul. 13, 2007.
Quinn et al., "Strategic Adaptation of SCA for STRS", NASA/CR-2007-214688 (Apr. 2007), 11 pages, citeseerx.ist.psu.edu/viewdoc/download?doi=10.0.1.116.8633.
Richardson, Kevin, "Software Communications Architecture and Related Specifications Overview", Apr. 9, 2006.
Robert et al., "Appendix A Embedded Software Defined Radio (SDR) With the Ossie Core Framework", Jul. 27, 2005, DCI Postdoctoral Research Fellowship and the MPRG Affiliates Program, 7 pages.

Robert et al., "OSSIE: Open Source SCA for Researchers", Proceeding of the SDR 04 Technical Conference and Product Exposition, 7 pages, 2004 http://www.sdrforum.org/pages/sdr04/3.2%20sca%20waveform%20design%20robert/3.2-3%20robert.pdf.
Robert, Dr. Max, "World's First Open-Source C++ Implementation of the SCA Released by MPRG", Proceeding of the SDR 02 Technical Conference and Product Exposition, 6 pages, 2002.
Schoenfelder, "Software Communication Architecture Radio Environment Performance Considerations", Proceedings of the SDR '09 Technical Conference and Product Exposition (2009), 6 pages, data.memberclicks.com/site/sdf/sdr09-1569204625.pdf.
"Software Communications Architecture Extensions", Dec. 22, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 15 pages.
"Software Communications Architecture Specification, Appendix A: Glossary", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 10 pages.
"Software Communications Architecture Specification, Appendix B: SCA Application Environment Profile", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 21 pages.
"Software Communications Architecture Specification, Appendix C: Core Framework IDL", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 41 pages.
"Software Communications Architecture Specification, Appendix D: Domain Profile", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 64 pages.
"Software Communications Architecture Specification, Attachment 2 to Appendix D: Common Properties Definitions", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 6 pages.
"Software Communications Architecture Specification", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 126 pages.
"Software Communications Architecture Specification", MSRC-5000SCA, V2.2, Nov. 17, 2001, Prepared for the Joint Tactical Radio Systems (JTRS) Joint Program Office, Prepared by the Modular Software-programmable Radio Consortium under Contract No. DAAB15-00-3-0001, 371 pages.
Gailliard et al., "Mapping Semantics of CORBA IDL and GIOP to Open Core Protocol for Portability and Interoperability of SDR Waveform Components", Thales Communications A.A., Colombes, France. EDAA, 2008, 6 pages. Available at http://www.date-conference.com/proceedings/PAPERS/2008/DATE08/PDFFILES/03.4_1.pdf.
Kuhns et al., "The Design and Performance of a Pluggable Protocols Framework for Object Request Broker Middleware", Dept. of Computer Science, Washington University, St. Louis, MO 63130, USA, Aug. 25-27, 1999 in Salem, MA, 15 pages. Found at http://www.cse.wustl.edu/~schmidt/PDF/PfHSN.pdf.
Kim et al., "Resource-Conscious Customization of CORBA for CAN-based Distributed Embedded Systems", School of Electrical Engineering and ERC-ACI, Seoul National University, Seoul, Korea. 19 pages. Printed May 2, 2011. Found at http://citeseerx.ist.psu.edu/viewdoc/download?doi=10.1.1.46.2116&rep=rep1&type=pdf.
Schmidt et al., "Applying Patterns to Develop a Pluggable Protocols Framework for ORB Middleware". Electrical & Computer Engineering Dept., University of CA, Irvine and the Dept. of Computer Science Washington University, St. Louis, MO. Apr. 3-7, 2000, 23 pages. Found at http://www.cse.wustl.edu/~schmidt/PDF/pluggable_protocols.pdf.

(56) References Cited

OTHER PUBLICATIONS

Subramonian et al., "Middleware Specialization for Memory-Constrained Networked Embedded Systems", Dept. of Computer Science and Engineering, Washington University, St. Louis, MO. 8 pages. Printed May 2, 2011. Found at http://www.cse.msu.edu/~glxing/docs/rtas04_nORB.pdf.

Adwankar, "Mobile CORBA", Networks and Infrastructure Department, Motorola Labs, 1301 E. Algonquin Road, Schaumburg, IL. Printed May 2, 2011, 12 pages. Found at http://citeseerx.ist.psu.edu/viewdoc/download?doi=10.1.1.91.3489&rep=rep1&type=pdf.

Schmidt et al., "Cisco/Motorola Proposal, Using a Real-Time Embedded ORB for ATM Switch Control and Management". Printed May 2, 2011, 9 pages. Found at http://www.cs.wustl.edu/~schmidt/PDF/vsi.pdf.

Gokhale et al., "Optimizing a CORBA Inter-ORB Protocol (IIOP) Engine for Minimal Footprint Embedded Multimedia Systems", Bell Laboratories, Lucent Technologies, 600 Mountain Avenue, Murray Hill, NJ, and Dept. of Computer Science, Washington University, One Brookings Drive, St. Louis, MO. Printed May 2, 2011, 27 pages. Found at http://www.cse.wustl.edu/~schmidt/PDF/JSAC-99.pdf.

Coulson et al., "Implementing the CORBA GIOP in a High-Performance Object Request Broker Environment", Distributed Multimedia Research Group, Computing Department, Lancaster University, Lancaster, UK. Printed May 2, 2011, 18 pages.

Kloukinas, Christos, "Distributed Systems, Session 3: Communication in Distributed Systems", Dept. of Computing, City University London. PowerPoint Presentation, printed May 2, 2011, 72 pages.

Common Object Request Broker Architecture (CORBA), Specification, Version 3.1, Part 1: CORBA Interfaces, 540 pages, Jan. 2008.

Common Object Request Broker Architecture (CORBA), Specification, Version 3.1, Part 2: CORBA Interfaces, 260 pages, Jan. 2008.

Office Action dated Aug. 20, 2013 from U.S. Appl. No. 13/068,061.

Response to Office Action dated Aug. 20, 2013 filed on Nov. 18, 2013.

Giddings et al., "Zeligsoft Component Based Software Design Using CORBA", www.zeligsoft.com, 12 pages, Copyright 2005.

Hermeling et al., "Zeligsoft Developing SCA Compliant Systems", www.zeligsoft.com, 12 pages, Copyright 2005.

Response to Office Action in Israel Patent Application No. 160057, filed on Mar. 7, 2012, and cover letter, 7 pages.

Final Office Action in Israel Patent Application No. 160057 dated Sep. 12, 2013 and cover letter and translated pending claim set, 8 pages.

Notice of Allowance in U.S. Appl. No. 13/068,061 dated Dec. 30, 2013, 23 pages.

\* cited by examiner

TargetEnvironment.spd.xml

```xml
<?xml version="1.0" encoding="US-ASCII"?>
<!DOCTYPE softpkg SYSTEM "softpkg.dtd">
<softpkg id="DCE:7649bdc0-3539-4249-b9cb-012ebc7c1aba"
    name="TargetEnvironment" type="sca_compliant" version="">
  <author>
    <name>Raytheon</name>
    <company>Raytheon, Inc.</company>
    <webpage>www.Raytheon.com</webpage>
  </author>
  <!-- [Implementation GPPDevice] -->
  <implementation id="DCE:3ba25201-6798-4953-b205-c98afb51b293"
aepcompliance="aep_compliant">
    <description/>
    <propertyfile>
       <localfile name="GPPDevice.prf.xml"/>
    </propertyfile>
    <code type="Executable">
       <localfile name="GPPDevice"/>
    </code>
    <os name="Linux" version=""/>
    <processor name="ARM5"/>
  </implementation>
  <!-- [Implementation DSPDevice] -->
  <implementation id="DCE:aae91f84-0737-4759-b5b2-7f0971baa4fb"
aepcompliance="aep_compliant">
    <description/>
    <propertyfile>
       <localfile name="DSPDevice.prf.xml"/>
    </propertyfile>
    <code type="Executable">
       <localfile name="DSPDevice"/>
    </code>
    <os name="Linux" version=""/>
    <processor name="ARM5"/>
  </implementation>
  <!-- [Implementation FPGADevice] -->
  <implementation id="DCE:7acb4a3d-190a-46a5-94c5-e66f10b5ff93"
aepcompliance="aep_compliant">
    <description/>
    <propertyfile>
       <localfile name="FPGADevice.prf.xml"/>
    </propertyfile>
    <code type="Executable">
       <localfile name="FPGADevice"/>
    </code>
    <os name="Linux" version=""/>
    <processor name="ARM5"/>
  </implementation>
  <!-- [Implementation AudioDevice] -->
  <implementation id="DCE:29f84c55-4edc-4beb-b9fd-b5b2e1f56351"
aepcompliance="aep_compliant">
    <description/>
    <propertyfile>
       <localfile name="AudioDevice.prf.xml"/>
    </propertyfile>
    <code type="Executable">
       <localfile name="AudioDevice"/>
```

FIG. 13A

TargetEnvironment.spd.xml

```xml
    </code>
    <os name="Linux" version=""/>
    <processor name="ARM5"/>
  </implementation>
  <!-- [Implementation SerialDevice] -->
  <implementation id="DCE:ef18b640-1346-484d-b33b-279ad02bb5d7"
aepcompliance="aep_compliant">
    <description/>
    <propertyfile>
      <localfile name="SerialDevice.prf.xml"/>
    </propertyfile>
    <code type="Executable">
      <localfile name="SerialDevice"/>
    </code>
    <os name="Linux" version=""/>
    <processor name="ARM5"/>
  </implementation>
</softpkg>
```

FIG. 13B

Implementation GPPDevice.prf.xml

```xml
<?xml version="1.0" encoding="US-ASCII"?>
<!DOCTYPE properties SYSTEM "properties.dtd">
<properties>
  <simple id="DCE:80BF17F0-6C7F-11D4-A226-0050DA314CD6" type="string"
name="os" mode="readwrite">
     <value>Linux</value>
     <kind kindtype="allocation"/>
     <action type="eq"/>
  </simple>
  <simple id="DCE:9B445600-6C7F-11D4-A226-0050DA314CD6" type="string"
name="processor"
       mode="readwrite">
     <value>ARM5</value>
     <kind kindtype="allocation"/>
     <action type="eq"/>
  </simple>
</properties>
```

FIG. 14

Implementation DSPDevice.prf.xml

```xml
<?xml version="1.0" encoding="US-ASCII"?>
<!DOCTYPE properties SYSTEM "properties.dtd">
<properties>
  <simple id="DCE:80BF17F0-6C7F-11D4-A226-0050DA314CD6" type="string"
name="os" mode="readwrite">
     <value>TIBIOS</value>
     <kind kindtype="allocation"/>
     <action type="eq"/>
  </simple>
  <simple id="DCE:9B445600-6C7F-11D4-A226-0050DA314CD6" type="string"
name="processor"
       mode="readwrite">
     <value>TI674x</value>
     <kind kindtype="allocation"/>
     <action type="eq"/>
  </simple>
</properties>
```

FIG. 15

FPGADevice.prf.xml

```xml
<?xml version="1.0" encoding="US-ASCII"?>
<!DOCTYPE properties SYSTEM "properties.dtd">
<properties>
   <simple id="DCE:9B445600-6C7F-11D4-A226-0050DA314CD6" type="string"
name="processor"
      mode="readwrite">
     <value>Altera</value>
     <kind kindtype="allocation"/>
     <action type="eq"/>
   </simple>
</properties>
```

FIG. 16

Implementation AudioDevice.prf.xml

```xml
<?xml version="1.0" encoding="US-ASCII"?>
<!DOCTYPE properties SYSTEM "properties.dtd">
<properties>
   <simple id="DCE:ce56ca4e-2816-4d34-959b-1f0a601528f1" type="string"
name="deviceKind"
      mode="readonly">
     <value>AudioDevice</value>
     <kind kindtype="allocation"/>
     <action type="eq"/>
   </simple>
</properties>
```

FIG. 17

Implementation SerialDevice.prf.xml

```xml
<?xml version="1.0" encoding="US-ASCII"?>
<!DOCTYPE properties SYSTEM "properties.dtd">
<properties>
   <simple id="DCE:ce56ca4e-2816-4d34-959b-1f0a601528f1" type="string" name="deviceKind"
        mode="readonly">
     <value>SerialDevice</value>
     <kind kindtype="allocation"/>
     <action type="eq"/>
   </simple>
</properties>
```

FIG. 18

ComponentExample.spd.xml

```xml
<?xml version="1.0" encoding="US-ASCII"?>
<!DOCTYPE softpkg SYSTEM "softpkg.dtd">
<softpkg id="DCE:043bbfe5-8684-4f20-8cdf-11e574ca9f62"
    name="ComponentExample" type="sca_compliant" version="">
  <author>
    <name>Raytheon</name>
    <company>Raytheon, Inc.</company>
    <webpage>www.Raytheon.com</webpage>
  </author>
  <descriptor name="ComponentInterface">
    <localfile name="ComponentInterface.scd.xml"/>
  </descriptor>
  <!-- [Implementation LinuxArmImpl] -->
  <implementation id="DCE:a0794b24-7b5f-4d0d-ac21-98c6b90dae64"
aepcompliance="aep_compliant">
    <description/>
    <code type="Executable">
      <localfile name="ComponentExample"/>
    </code>
    <os name="Linux" version=""/>
    <processor name="ARM5"/>
  </implementation>
    <!-- [Implementation LinuxX86Impl] -->
    <implementation id="DCE:a0794b24-7b5f-4d0d-ac21-98c6b90dae65"
aepcompliance="aep_compliant">
    <description/>
    <code type="Executable">
      <localfile name="ComponentExample"/>
    </code>
    <os name="Linux" version=""/>
    <processor name="X86"/>
  </implementation>
</softpkg>
```

FIG. 19

OPTIMIZED SCA CORBA DESCRIPTOR FOR SCA CORBA DESCRIPTOR FILES

FIELD OF THE INVENTION

Embodiments of the invention generally relate to software communication architectures for radios and other applications. More particularly, the invention relates to systems and methods that improve operation of such software communication architectures by moving certain XML optimizations offline to avoid unnecessary processing of converting component implementation device and software dependencies information into the correct types and in the correct order.

CROSS-REFERENCE TO RELATED APPLICATION

This application is related to a commonly assigned United States Nonprovisional Patent Application filed on May 2, 2011, having Ser. No. 13/068,061, entitled "Systems, Methods, and Language for SCA CORBA Descriptor files", which application shares the same inventors Gerald L. Bickle and Susan J. Silver as the present application ("'061 application'"). The entire contents of the '061 application, including its Computer Program Listing Appendix, is hereby incorporated by reference.

COMPUTER PROGRAM LISTING APPENDIX

This application includes herewith a transmittal under 37 C.F.R §1.52(e) of a Computer Program Listing Appendix on Compact Disk (CD), where the transmittal comprises duplicate compact discs (CDs), totaling two (2) CDs, respectively labeled "Copy 1" and "Copy 2". Each disk contains the same files. The discs are IBM-PC machine formatted and MICROSOFT WINDOWS Operating System compatible, and include identical copies of the following list of eight (8) files, where each file has been saved as a document viewable using MICROSOFT WORD. All of the materials on the compact disk, including the computer program listings contained in the following eight (8) files, are incorporated herein by reference in their entirety. The eight files include:
CF_Parsers_IDL.doc (96 Kbytes) (Nov. 21, 2011);
CF_PreParsers_IDL.doc (125 Kbytes) (Nov. 21, 2011);
DeviceConfigurationParser_IDL.doc (28 Kbytes) (Nov. 21, 2011);
DCD_IDL.doc (30 Kbytes) (Nov. 21, 2011);
DomainManagerConfigurationParser_IDL.doc (30 Kbytes) (Nov. 21, 2011);
DMD_IDL.doc (30 Kbytes) (Nov. 21, 2011);
SoftwareAssemblyParser_IDL.doc 29 Kbytes) (Nov. 21, 2011); and
SAD_IDL.doc (31 Kbytes) (Nov. 21, 2011).

COPYRIGHT NOTICE

A portion of the disclosure of this patent document contains material which is subject to copyright protection (including, but not limited to the material contained in the Computer Program Appendix). The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A Software Defined Radio (SDR) is a radio whose function is defined not by its underlying hardware, but instead by its software, such that its output signal is determined by software. SDR systems are thus reconfigurable, within the limits of the actual underlying hardware capabilities, by loading new software as required by a user. FIG. 1 is a block diagram of an exemplary prior art SDR system 20. The exemplary SDR system 20 includes a means for receiving an analog or digital radio waveform at a transmission frequency (e.g., an antenna 28 and associated hardware) along with an SDR hardware component 26, an SDR software component 24, and an SDR client 22.

The SDR hardware component 26 includes a radio receiver and/or radio transmitter (which is shown for illustrative purposes only in FIG. 1 as a radio transceiver 34), as well as an analog-to-digital (A/D) converter (ADC) 30 for conversion of the radio waveform 48 (also referred to as analog baseband input) is required) to a digital baseband input signal 44 to the SDR software c component 24, and a digital to analog (D/A) converter (DAC) 32, for D/A conversion of the digital baseband output 46 from the SDR software component 24. The radio transceiver 34 is a component well understood by those of skill in the art and includes, for example, a radio frequency (RF) subsystem 38 and an intermediate frequency (IF) subsystem 36. In the receiving mode, signals received by the antenna 28 are processed by the RF subsystem 38 and IF subsystem 36: for example, the signals received at antenna 28 can be processed in a tuner (to select the desired signal, such as by filtering), a detector (to extract audio signal from the signal selected by the tuner), downconverted to the desired baseband frequency, and then sent to the ADC 30 to be converted from an analog baseband signal 48 to a digital baseband data signal 44.

In the transmit mode, the digital baseband output signal 46 from the SDR software component 24 is sent to DAC 32 for conversion to an analog baseband output signal 49, the analog baseband output signal 49 is sent the IF subsystem 36 and RF subsystem 38 of the radio transceiver 34 to the basic radio transceiver 26 for further processing, which may include upconverting the analog baseband output signal 49 to the appropriate transmission frequency, amplification, and filtering, then sent to antenna 28 for transmission.

The SDR software component 24 runs on a host, which can be a general-purpose computer system (such as described further herein in connection with FIG. 2), or hardware that has been configured by software, such as a field-programmable gate array (FPGA), embedded computing device, multiprocessor embedded systems, any equivalent computing/processing circuit. A waveform can consist of a set of SDR software components executing on general purpose processors, FPGA's, digital signal processors, etc. The host is able to handle a considerable amount of the signal processing previously done by conventional radio hardware components such as mixers, filters, amplifiers, modulators/demodulators, detectors, etc. Thus, the SDR system 20 provides a radio that can receive and transmit widely different radio protocols (sometimes referred to as waveforms) based solely on the software used.

The SDR software component 24 is in operable communication with the SDR hardware component 26 via one or more data channels. For example, in FIG. 1, the data channels include a first data channel 44 that permits reception of digital baseband input data from the ADC 30 of the SDR hardware component 26, a second data channel 46 that permits transmission of digital baseband output data from the SDR software component 24 to the SDR hardware component 26, and a control data channel 47 that permits transmission of control data from the SDR software component 24 to the SDR hardware component 26. The SDR software component 24 receives client input data 40 from an SDR client 22 and sends client output data 42 to the SDR client 22.

The digital baseband output 46 typically results from the SDR software component 24 performing a series of digital signal processing (DSP) functions necessary to prepare the client input data 40 from the SDR client 22 for transmission by the SDR hardware component 26. These functions may include: source encoding, encryption, error-correction coding, and baseband modulation, as well as the aforementioned functions performed by hardware components such as mixers, filters, amplifiers, modulators/demodulators, detectors, etc.

The SDR software component 24 of FIG. 1, as noted above, as well as the SDR client 22, each can be implemented using a known computing system such as a general purpose computer. FIG. 2 provides an illustration giving an overview of an exemplary computing system 50 usable with at least some embodiments of the invention. Note that systems and methods in accordance with the invention can be implemented using any type of computer system running any one or more types of operating systems. Exemplary types of computer systems on which at least some embodiments of the invention can be embodied include any system or device having a processor (or equivalent processing functionality) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, music playing device, electronic reading device) server, workstation, and interconnected group of computers, as well as any other type of device having a microprocessor installed or embedded thereto, such as a field-programmable gate array (FPGA).

Referring now to FIG. 2, the computer system 50 includes a central processor 1, associated memory 2 for storing programs and/or data, an input/output controller 3, a disk controller 4, a network interface 5, a display device 7, one or more input devices 8, a fixed or hard disk drive unit 9, a removal storage device/drive (optional) 13, optionally a backup storage device (e.g., a tape drive unit) (not shown) and a data bus 6 coupling these components to allow communication therebetween.

The central processor 1 can be any type of microprocessor, such as a PENTIUM-family processor, made by Intel of Santa Clara, Calif. The display device 7 can be any type of display, such as a liquid crystal display (LCD), plasma display, cathode ray tube display (CRT), light emitting diode (LED), and the like, capable of displaying, in whole or in part, any desired information. The input device 8 can be any type of device capable of providing the desired inputs, such as keyboards, numeric keypads, touch screens, pointing devices, switches, styluses, and light pens. The network interface 5 can be any type of a device, card, adapter, or connector that provides the computer system 50 with network access to a computer or other device, such as a printer. For example, the network interface 5 can enables the computer system 50 to connect to a computer network such as the Internet. Other computer accessories well-known to those of skill in the art (e.g., microphones, cameras, speakers, biometric access-control devices such as fingerprint scanners, etc.), although not illustrated in the block diagram of FIG. 2, can of course be included as part of the computer system 50.

SDR is advantageous, flexible, efficient, and economical for users, because the SDR can evolve to meet changing or new standards by replacing software. In addition, use of SDR improves interoperability, because groups that each use SDR devices based on incompatible standards can communicate with each other by loading each group's SDR device with software that enables the two incompatible SDRs to communicate. SDR can be advantageous in military applications, and the United States Department of Defense (DoD), through its, Joint Tactical Radio System (JTRS) Joint Program Execute Office (JPEO) in San Diego, Calif., now requires that all radios delivered to any of the armed forces adhere to a so-called "Software Communications Architecture" (SCA) specification for SDR, which specification is hereby incorporated by reference in its entirety. Goals of the SCA standard include allowing all military branches to cooperate, reduce cost, increase interoperability, and provide the ability to upgrade and/or extend such SDRs developed in accordance with the SCA, from either or both of the software and hardware sides of the radio.

Several versions of the SCA specification have been developed, At the time of this writing the latest specification prepared by the STRS JPEO is SCA 2.2.2 dated 15 May 2006, the entirely of which is hereby incorporated by reference, including all of its appendices, including Appendix A (Glossary)), Appendix B (Application Environment Profile (AEP)), Appendix C (Interface Definition Language (IDL)), Appendix D (Domain Profile), Appendix D (Common Properties) Attachment, Appendix D (Common Properties) Readme Attachment. In addition, as of this writing, a new proposed SCA specification, tentatively referred to as SCA NEXT, was introduced in December 2010, Both SCA 2.2.2 and SCA NEXT, including all Appendices, are hereby incorporated by reference.

FIG. 3A is an illustrative block diagram of a prior art SCA architecture 10 (developed in accordance with SCA 2.2), which architecture illustrates the general structure of its software architecture. FIG. 3B is a prior art block diagram 11 showing the core framework (CF) layer 16 interface definition language (IDL) relationships of the prior art architecture of FIG. 3A. The prior art systems of FIGS. 3A and 3B are described briefly below and in greater detail in the SCA 2.2.2 specification itself. The elements in and operation of FIGS. 3A and 3B, along with a detailed description of a related prior art embedded distributed XML parser, are further described in commonly-assigned U.S. Pat. No. 7,367,020 ("the '020 patent"), entitled "Executable Radio Software System and Method," which is herein incorporated by reference in its entirety.

As illustrated in FIGS. 3A and 3B, software used in at least some SCA architectures/systems 10 is organized into three layers: a processor environment layer (including operating system 12), a middleware layer 14, and a so-called "core framework" (CF) layer 16 (also referred to as a component framework layer), which includes a CF layer IDL 16a and CF layer services and applications 16b. This layer structure helps to isolate the waveform applications from the radio hardware. The processor environment layer and the middleware layer are generally commercially available off-the-shelf products. The CF layer 16, however, which is defined to be an open means to promote plug-and-play software interoperability, has been developed by a number of different suppliers, including but not limited to Raytheon Corporation of Waltham, Mass., ITT Industries of Clifton N.J., BAE Systems of the United Kingdom; Boeing Corporation of Chicago, Ill.; PrismTech of Woburn, Mass.; Communications Resource Center (CRCO) of Ottawa, Ontario Canada, and Selex Communications of Italy, as well as universities such as the Virginia Polytechnic Institute. An exemplary prior art CF layer 16 implementation is application independent, but also can be platform dependent.

The CF layer 16 also is the essential set of open application interfaces and services that provide an abstraction of the underlying Commercial Off-The-Shelf (COTS) software and hardware. Portability is achieved by implementing this same set of CF layer 16 application program interfaces on every platform. One purpose of the CF layer 16 is to deploy (load and execute) a distributed application in a controlled and secured manner. At startup, the CF layer 16 reads information in the Domain Profile (described further below) and attempts to deploy a given application to the platform, in accordance with relationships defined in the Domain Profile. Although the Domain Profile is not depicted in this figure, it is well understood by those skilled in the art and familiar with the SCA; further as those of skill in the art are aware, XML parsing of the domain profile inherently is one of the services that the CF layer 16 uses. The CF layer 16 is able to download a component (e.g., a software component) to a device, couple components together to enable them to communicate, stop and start components, handle errors, and perform other management tasks for the components. As illustrated in FIG. 3B, the CF layer 16 includes a CF Interface Definition Language (IDL) 16a and CF layer services and applications 16b. CF layer services 166, in one exemplary prior art embodiment, consist of a Domain Manager that implements system control, a Device Manager that loads software and manages a set of hardware devices, and core services such as Log, File Manager, and File System. The CF layer 16 also includes a domain manager that managers the software applications, applications factories, hardware devices, and device manager. Although the details of the CF layer's domain manager and service 16b are not expressly illustrated in FIG. 3B, such services are known to those of skill in the art and, furthermore, are shown and described in further detail in the aforementioned SCA 2.2.2 Specification and '020 patent, which are incorporated by reference.

The aforementioned Domain Profile includes a set of files in eXtensible Mark-up Language (XML) format. As is known in the art, XML is a set of rules for encoding documents in machine readable form. An XML parser parses an XML-encoded document so as to convert the XML-encoded document into an XML Document Object Model (DOM), which can then be manipulated (e.g., displayed in a browser), where the XML parser ensures that the document meets defined structures, validation, and constraints (which can be defined in a document type definition (DTD)). For example, the SCA defines XML DTDs for application, device, and service deployment information, all of which are used by the SCA Domain Manager, Application Factory, and Device Manager components of the SCA. FIG. 6, described further herein, depicts the set of XML DTD types.

The Domain Profile is a hierarchical collection of XML files that define the properties of all software components in the system and describes the SCA system's components and connections between components and describes various aspects of the hardware and software devices making up the SCA system, including the identity, capabilities, properties (including properties of embedded hardware devices), and interdependencies, as well as information about the external interfaces of the components and devices, their implementations, and how they are connected to form applications and platforms. An exemplary Domain Profile includes a set of descriptor files for describing the application (the Software Profile) and a set of descriptor files for describing the platform (the Device Profile).

Often the Domain Profiles can include a large amount of information (e.g., tens of thousands of lines of XML code spread over hundreds of files). At runtime, the XML Domain Profile is read to get configuration and deployment information. The parsing of these XML Domain Profile files, and the interpretation of the parsed data by the SCA CF, loads software components of the SCA and creates the connections between such software components and thus enables the radio to operate. The XML Domain Profile can be parsed by the SCA CF layer 16 each time the SCA radio is turned on or when an application is installed into the radio Domain. The result, in some instances, is the requirement of multiple distributed software components within the radio Domain to parse XML files.

One way the prior art CF layer 16 deploys the distributed application is through the use of CORBA. CORBA is the acronym for Common Object Request Broker Architecture, which is a standard defined by the Object Management Group (OMG) that enables software components written in multiple computer languages and running on multiple computers to work together as a single application or set of services. CORBA uses an interface definition language (IDL) to specify interfaces that objects will present to the outside world, and specifies a mapping from the IDL to a specific implementation language. Because of the use of the CORBA distributive middleware layer and Portable Operating System Interface (POSIX)-compatible open system environment, the CF layer 16 supported components can port with relative ease across different processors, Real Time Operating Systems (RTOSs), buses and Object Request Brokers (ORBs). Further information about CORBA can be found in the CORBA Specification, version 3.1 (January 2008), including Part 1 (CORBA Interface) and Part 2 (Interoperability), available from the Object Management Group (OMG), 109 Highland Ave, Needham, Mass. 02494. The CORBA Specification is hereby incorporated by reference in its entirety Referring again to FIGS. 3A and 3B the middleware layer 14 typically includes CORBA. (distributive middleware layer) and Real Time Operating System (RTOS). As noted above, the prior art system of FIGS. 3A and 3B, as implemented in the '020 patent, also includes an embedded distributed XML parser that parses Domain profiles (which typically are defined in the SCA) of the applications for more efficiently installing and running the application. The CF layer 16 Domain Management subsystem is advantageously configured to invoke the XML parser only upon the installation of a new application or device.

As noted in the aforementioned and incorporated-by-reference '061 application one issue with at least some known implementations of the aforementioned SCA radio system is that the XML Document Object Model (DOM) validation parsers of the SCA generally are slow and large in code size and can require considerable General Purpose Processor (GPP) resources.

Various solutions have been proposed to provide an alternative to the way the existing XML DOM validation parsing function is provided, so as to improve speed and/or reduce the code size. Some proposed solutions involve offline XML parsing and/or various types of preparsing, which can be advantageous if the platform and device resources are known prior to the time of waveform deployment. For example, in the aforementioned and incorporated-by-reference '061 application, a proposed solution is provided that reduces code size and processing time by replacing the XML parser and XML files with a CORBA parser and CORBA descriptor files, so as to effectively eliminate the XML parser within the SCA radio system. For example, in one aspect the '412'061 application uses the CORBA CODEC mechanism to create a CORBA parser to replace the XML parser and uses CORBA descriptor files to replace the XML files, to greatly reduce the code size, improve parsing speed, and generally require fewer processing resources. In a further aspect, the '061 application provides a software architecture that includes a CORBA local parser interface; CORBA encoding for certain CORBA deployment types; pre-processor tools to convert XML into the CORBA deployment types and CORBA files; and, local parser interfaces for the SCA SAD and DMD, optional for the DCD when Device Manager when non-collocated with Domain Manager.

The aforementioned '061 application also provides a unique, advantageous preparsers tool located in the offline environment (i.e., a tool that is running on a system that is remote from the SDR system itself). For each type of descriptor (for example, Device Configuration Descriptor (DCD), Domain Manager Descriptor (DMD), and Software Assembly Descriptor (SAD)) used in the SCA, this offline preparsers tool preparses the XML files, including the XML descriptor files, using a COTS parser, then collapses the preparsed XML descriptor files into a corresponding CORBA structure (SAD, DCD, and DMD) that is encoded into a CORBA Common Data Representation (CDR) file using the CORBA CODEC factory. This resulting CDR file is provided to the SDR system (also referred to herein as the embedded environment or target environment), which uses the CORBA CODEC factory to decode the CDR file and extract from it the resultant CORBA structure descriptors (e.g., SAD, DCD, DMD).

In a further aspect of the incorporated-by-reference '061 application, three respective pre-processor tools pre-parse Device Configuration Descriptor (DCD), Software Assembly Descriptor (SAD), and Domain Manager Descriptor (DMD) XML files into respective CORBA structures, then convert these respective CORBA structures into respective CORBA encoded CDR files. Thus, for example, the SAD CORBA file contains a SAD encoded CDR CORBA structure (similarly true for DCD and DMD CORBA files). These preparsers tools parse and convert the XML files into CORBA representation using, at least in part, the CF PreParsers IDL.

In particular, the embodiments described in the '061 patent application improved on the prior art by:

(a) reducing this code size and processing time by replacing the XML parser and XML files with a CORBA parser and CORBA descriptor files, so as to effectively eliminate the XML parser within the SCA radio system;

(b) using CORBA's built in coding and decoding (CODEC) mechanisms, such CODEC mechanisms (along with other aspects of CORBA) to implement a system wherein the CORBA CODEC mechanism can be used, along with other features, to create, effectively, a CORBA parser to replace the XML parser; and (c) providing a unique, advantageous preparsers tool located in the offline environment (i.e., a tool that is running on a system that is remote from the SDR system itself) that, for each type of descriptor (for example, Device Configuration Descriptor (DCD), Domain Manager Descriptor (DMD), and Software Assembly Descriptor (SAD)) used in the SCA, preparses the XML files, including the XML descriptor files, using a COTS parser, then collapses the preparsed XML descriptor files into a corresponding CORBA structure (SAD, DCD, and DMD) that is encoded into a CORBA Common Data Representation (CDR) file using the CORBA CODEC factory. This resulting CDR file is provided to the SDR system (also referred to herein as the embedded environment or target environment), which uses the CORBA CODEC factory to decode the CDR file and extract from it the resultant CORBA structure descriptors (e.g., SAD, DCD, DMD).

In the aforementioned '061 patent application, when the XML information is converted into CORBA property types during preparsing, the conversion is done such that the XML Properties (e.g., component instance properties for the different properties types) are converted to an appropriate core framework (CF) properties type, with correct values types and in correct precedence order, so that no further conversion is required when they are used with an SDR system. (The precedence order is well understood by those of skill in the art and is understood in connection with the rules specified in SCA version 2.2.2 section D.2.1 Software Package, D.6.1.3.3 componentinstantiation, concerning precedence order.)

As those of skill in the art will appreciate, the '061 patent application's above described inventive preparsers tools and XML properties conversion features helps to reduce code size and provide for more efficient operation of the SDR system, because these functions will no longer have to be done during run-time of the SDR system, but instead are done in an offline environment. For example, in one described embodiment of the '061 patent application, XML deployment information is captured in the following CORBA structures: Software Assembly Descriptor (SAD) structure, for an application that relates to SAD, Software Package Descriptors, (SPDs), Software Component Descriptors (SCDs), Application Deployment Descriptors (ADD), and Properties Descriptors (PRFs) SCA; DTDs; Device Configuration Descriptor (DCD) structure, for Device Manager that relates to DCD, SPDs, Device Package Descriptors (DPD), SCDs and PRFs SCA DTDs; and Domain Manager Configuration Descriptor (DMD) structure, for Domain Manager that relates to SCA, DMD, SPD, SCD, Deployment Platform Descriptor (PDD), PRFs, SCA DTDs.

These SAD, DCD, and DMD CORBA structures are defined based on the types defined by the existing core framework (CF) Parsers IDL interfaces for the SCA, which interfaces are further explained herein, in the figures and text, and further in the incorporated-by-reference computer program appendices, the incorporated-by-reference prior '720 patent, the incorporated-by-reference CORBA Specification, and in the incorporated-by-reference SCA Specification. Further, in one described embodiment of the '061 application, if an interface or interface operations are no longer needed by a given CF implementation, it is removed from the interface since the XML parsing is done offline.

In the '061 patent application, a method is described where three respective pre-processor tools pre-parse Device Configuration Descriptor (DCD), Software Assembly Descriptor (SAD), and Domain Manager Descriptor (DMD) XML files into respective CORBA structures, then convert these respective CORBA structures into respective CORBA encoded CDR files. Thus, for example, the SAD CORBA file contains a SAD encoded CDR CORBA structure (similarly true for DCD and DMD CORBA files). These preparsers tools parse and convert the XML files into CORBA representation using, at least in part, the CF PreParsers IDL. In addition, in one aspect of the '061 patent application, the CF_Parsers IDL file is modified by adding a local interface to its interface definitions, so that only client code is generated (and not skeletal server side code). Further, with this aspect, there need not be CORBA marshalling of interface operations (i.e., CORBA need not serialize objects associated with interface operations). For instances where the device manager is not co-located with the domain manager, the local interface is optional compile directive.

In another aspect of the '061 patent application, a software architecture is described as having a CORBA local parser interface; CORBA encoding for certain CORBA deployment types; pre-processor tools to convert XML into the CORBA deployment types and CORBA files; and, local parser interfaces for the SCA SAD and DMD, optional for the DCD when Device Manager when non-collocated with Domain Manager. Furthermore, when using the core framework (CF) implementation described in the '016 patent application in a system having a CF implementation (e.g., one based on one described in the aforementioned '020 patent) at least one or more of the embodiments of the invention described in the '061 patent application can be configured to have minimal impact to such an the existing CF Domain Manager, Device Manager, and Application Factory associated with the CF implementation based on the '020 patent, because the at least one or more embodiments, as described in the '061 patent application, can be configured to use substantially similar interfaces, types and operations.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

As noted above, offline parsing and preparsing can be helpful in parsing XML files used with the SCA and/or SDR. Furthermore, the aforementioned, incorporated-by-reference '061 patent application describes several types of PreParsers tools that can convert SCA XML files into CORBA structures usable by a Software Communication Architecture (SCA) Core Framework (CF) and which also help to speed up the parsing process, by replacing the XML parser and XML files with a CORBA parser and CORBA descriptor files, so as to effectively eliminate the XML parser within the SCA radio system. However, the inventors of the '061 patent application have found that it is possible to achieve even further deployment optimizations, especially relating to software dependencies for device dependencies.

Accordingly, at least one embodiment of this invention described herein proposes further XML optimizations that can be done offline to avoid unnecessary processing of converting component implementation device and software dependencies information into the correct types and in the correct order. In prior art systems, during execution of processes running on the hardware (e.g., software defined radio (SDR) hardware), deployment processing converts pre-parsed information into the correct deployment dependencies types, to deploy a component successfully. This requires extra processing by the hardware (e.g., radio) deployment processing to convert pre-parsed information into the correct deployment types.

In contrast, at least some embodiments of the invention help to reduce core framework (CF) implementation code by using optimized parser types. By providing additional pre-parser input target environment and device dependencies files, the software implementation dependencies can be parsed and converted into the correct types needed by the CF implementation. Advantageously, at least some embodiments of the invention can be implemented using similar interfaces and operations as those described in the aforementioned, incorporated by-reference '061 patent application, or using similar interfaces and operations as those used in a given prior art SCA system, so that there is minimal impact to existing CF Domain Manager, Device Manager and Application Factory implementations.

As a further improvement to the preparsers tool provided in the '061 application, at least some embodiments of the invention described herein provide further XML optimizations that are done offline to avoid unnecessary processing of converting component implementation device and software dependencies information into the correct types and in the correct order. For example, in at least some embodiments, the further XML optimizations include converting software implementation device dependencies into the expected run-time deployment types so no type conversion happens during deployment. Additional implementation library dependencies are also in the correct order and their device dependencies are collapsed into one set of device dependencies. In at least some embodiments, the invention includes additional pre-parser input target environmental and device dependencies files, so that the software implementation dependencies can be parsed and converted into the correct types needed by the core framework (CF) implementations. With these embodiments, the optimized parser types help to further reduce CF code and processing time. Advantageously, at least some of the embodiments described herein have minimal impact to existing CF Domain Manager, Device Manager, and Application Factory implementations, since similar interface and operations are being used.

In one aspect, the invention provides a preparsers tool for converting Software Communications Architecture (SCA) XML files into Common Object Resource Broker Architecture (CORBA) structures usable by an SCA Core Framework (CF), the preparsers tool stored on a computer storage medium and configured to operate on a processor remote from the SCA CF. This preparsers tool comprises a core framework (CF)_PreParsers interface definition language (IDL) in operable communication with a first type of preparser. The CF_PreParsers IDL is configured to be in operable communication with an XML parser and with at least a first type of preparser. The first type of preparser is associated with a first type of descriptor for the CF, where the first type of descriptor is configured to:

call the XML parser to request parsing of a first set of first XML files;

retrieve a first set of target environment implementation definitions (TEID), the TEID defining at least one characteristic of a target environment to which a first CORBA Common Data Representation (CDR) data file is provided;

retrieve a first set of target environment implementation definitions (TEID), the TEID defining at least one characteristic of a target environment to which a first CORBA Common Data Representation (CDR) data file is provided convert the first parsed set of first XML files into a first CORBA structure type, the first CORBA structure type based at least in part on at least one predetermined type associated with the SCA CF, the conversion based at least in part on the TEID, such that the conversion of the first parsed set of first XML files results in a first CORBA structure having a type and precedence order that is correct for the target environment;

encode the first CORBA structure type into a first CORBA Common Data Representation (CDR) file; and write the first CORBA CDR to file as a first octet sequence.

In a further embodiment, the TEID of the preparsers tool is constructed and arranged to enable the preparsers tool to select a target-appropriate implementation from a software package descriptor (SPD), where the target-appropriate implementation corresponds to an implementation element of the SPD that is applicable to the target environment in which the CORBA CDR file is provided. In one In one embodiment, the TEID further comprises a set of device definitions dependencies (DDD), the DDD comprising visible and external device allocation properties. In one embodiment, the TEID comprises a software package descriptor (SPD) extensible markup language (XML) file that comprises one set of device definitions for a device used in the target environment. For example, in one embodiment, the SPD XML device definitions comprise at least one allocation property for the device. In another embodiment, the set of device definitions in the SPD XML file comprise a reference to a Device Implementation, the Device Implementation comprising a reference to a property file describing at least one allocation property for the device.

In a further embodiment, in the preparsers tool, for a software component being loaded as part of the preparsing, the component instantiation's implementation device dependencies comprises a single implementation device dependencies list comprising a first part comprising visible device dependencies and a second part comprising external device dependencies. For example, in one embodiment, the preparser is further configured to convert the implementation's external device dependencies to the proper SCA CF::Properties type by using input device allocation property definitions provided by a TEID property file. In another embodiment, the preparser is further configured to convert the implementation's visible device dependencies to the proper device allocation type and equality operator by using the provided input device allocation property definitions provided by a TEID property file.

In still another embodiment of the preparsers tool, for an application software component implementation being loaded as part of the preparsing, the component instantiation's implementation software dependencies are formed into a single precedence order list in order of loading dependency software. In still another embodiment, for an application software component implementation being loaded as part of the preparsing, the component instantiation's implementation executable software dependency is converted to a component instantiation element.

In still another embodiment, for an application software component implementation being loaded as part of the preparsing, the component instantiation's deployment dependencies are merged together into one implementation device dependencies list that is separated into a first portion comprising visible device dependencies and a second portion comprising external device dependencies. For example, in one embodiment, for the application software component implementation being loaded as part of the preparsing, the preparser is further configured to convert the component instantiation's deployment dependencies external device dependencies to the proper SCA CF::Properties type by using the provided input device allocation property definitions provided by a TEID property file. In another example, in one embodiment, for the application software component implementation being loaded as part of the preparsing, the preparser is further configured to convert the component instantiation's deployment dependencies visible device dependencies to the proper device allocation type and equality operator by using the provided input device allocation property definitions provided by a TEID property file.

In another embodiment, in the preparsers tool, for an application software component being loaded as part of the preparsing, the component instantiation's implementation usesdevice dependencies is separated into 2 parts: visible device dependencies and external device dependencies. For example, in one embodiment, the preparser is further configured to convert the implementation's usesdevice external device dependencies to a proper SCA CF::Properties type by using provided input device allocation property definitions provided by a TEID property file. In another example embodiment, the preparser is further configured to convert the implementation's usesdevice visible device dependencies to a proper device allocation type and equality operator by using provided input device allocation property definitions provided by a TEID property file.

In another aspect, the invention provides a method of preparsing Software Communications Architecture (SCA) XML files that are converted into Common Object Resource Broker Architecture (CORBA) structures usable by an SCA Core Framework (CF), the preparsing method configured to operate on a processor remote from the SCA CF. The method comprises:

providing a core framework (CF)_PreParsers interface definition language (IDL)-configured to be in operable communication with an XML parser and with at least a first type of preparser;

providing a first type of preparser in operable communication with the CF_PreParsers IDL, the first type of preparser associated with a first type of descriptor for the CF;

calling the XML parser to request parsing of a first set of first XML files;

retrieving a first set of target environment implementation definitions (TEID), the TEID defining at least one characteristic of a target environment to which a first CORBA Common Data Representation (CDR) data file is provided;

converting the first parsed set of first XML files into a first CORBA structure type, the first CORBA structure type based at least in part on at least one predetermined type associated with the SCA CF, the conversion based at least in part on the TEID, such that the conversion of the first parsed set of first XML files results in a first CORBA structure having a type and precedence order that is correct for the target environment;

encoding the first CORBA structure type into a first CORBA Common Data Representation (CDR) file; and writing the first CORBA CDR to file as a first octet sequence.

In a further embodiment of this aspect, the method further comprises merging together, for each component in the target environment, at least one of the:

(a) component instantiation implementation software device dependencies;

(b) component instantiation implementation usesdevice dependencies; and (c) component instantiation implementation deployment dependencies;

into an implementation device dependencies list having a first part comprising visible device dependencies and a second part comprising external device dependencies;

converting the implementation's external device dependencies to the proper SCA CF::Properties type by using input device allocation property definitions provided by a TEID property file; and converting the implementation's visible device dependencies to the proper device allocation type and equality operator by using the provided input device allocation property definitions provided by the TEID property file.

In still another aspect, the invention comprises a preparser system for converting for converting Software Communications Architecture (SCA) XML files into Common Object Resource Broker Architecture (CORBA) structures usable by an SCA Core Framework (CF), the preparsing system configured to run on a processor implemented on a computer system in operable communication with and remote from the SCA CF. The preparsing system comprises a computer storage medium, storing therein computer-readable code usable by a processor, and a processor in operable communication with the computer storage medium. The computer is configured to: run the computer-readable code so as to:

provide a core framework (CF)_PreParsers interface definition language (IDL) configured to be in operable communication with an XML parser and with at least a first type of preparser;

provide a first type of preparser in operable communication with the CF_PreParsers IDL, the first type of preparser associated with a first type of descriptor for the CF;

call the XML parser to request parsing of a first set of first XML files;

retrieve a first set of target environment implementation definitions (TEID), the TEID defining at least one characteristic of a target environment to which a first CORBA Common Data Representation (CDR) data file is provided;

merge together, for each component in the target environment, at least one of the: (a) component instantiation implementation software device dependencies; (b) component instantiation implementation usesdevice dependencies; and (c) component instantiation implementation deployment dependencies, into an implementation device dependencies list having a first part comprising visible device dependencies and a second part comprising external device dependencies;

convert the implementation's external device dependencies to the proper SCA CF::Properties type by using input device allocation property definitions provided by a TEID property file;

convert the implementation's visible device dependencies to the proper device allocation type and equality operator by using the provided input device allocation property definitions provided by the TEID property file;

convert the first parsed set of first XML files into a first CORBA structure type, the first CORBA structure type based at least in part on at least one predetermined type associated with the SCA CF, the conversion based at least in part on the TEID, such that the conversion of the first parsed set of first XML files results in a first CORBA structure having a type and precedence order that is correct for the target environment;

encode the first CORBA structure type into a first CORBA Common Data Representation (CDR) file; and write the first CORBA CDR to file as a first octet sequence.

Furthermore, the architectures and methods which are the subject of this disclosure can be used in conjunction with (and/or adapted to work with) the aforementioned Software Communications Architecture (SCA) for Software Defined Radio's (SDRs), both the existing 2.2/2.2.2. Specification and future Specifications (e.g., SCA Next and beyond), all of which are hereby incorporated by reference, as well as with the aforementioned systems described in the incorporated-by-reference '020 patent. It is anticipated that at least some of the architectures and methods of this disclosure also are applicable to other types of SDRs, including but no limited to the so-called open source GNU Radio system, as well as to other systems and devices that utilize principles of SDR and/or that use software components to communicate with different waveforms or protocols/standards, such as mobile/cellular telephones and other wireless network devices. It is further anticipated that at least some of the architectures and/or methods of this invention are applicable to other technologies and/or domains that require a lightweight deployment and configuration infrastructure, as well as any application that is using CORBA and XML internally.

Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein:

FIGS. 13A-13B are a listing of an exemplary TargetEnvironment Software Package Descriptor (SPD) XML file, TargetEnvironment.spd.xml, in accordance with one embodiment of the invention;

FIG. 14 is a listing of a first exemplary Device Implementation file, GPPDevice.prf.xml, in accordance with one embodiment of the invention;

FIG. 15 is a listing of a second exemplary Device Implementation file, DSPDevice.prf.xml, in accordance with one embodiment of the invention;

FIG. 16 is a listing of a third exemplary Device Implementation file, FPGADevice.prf.xml, in accordance with one embodiment of the invention;

FIG. 17 is a listing of a fourth exemplary Device Implementation file, AudioDevice.prf.xml, in accordance with one embodiment of the invention;

FIG. 18 is a listing of a fifth exemplary Device Implementation file, SerialDevice.prf.xml, in accordance with one embodiment of the invention; and FIG. 19 is a listing of an exemplary Component Software Package Descriptor (SPD) that specifies more than one implementation element, in accordance with one embodiment of the invention.

Figure 1:
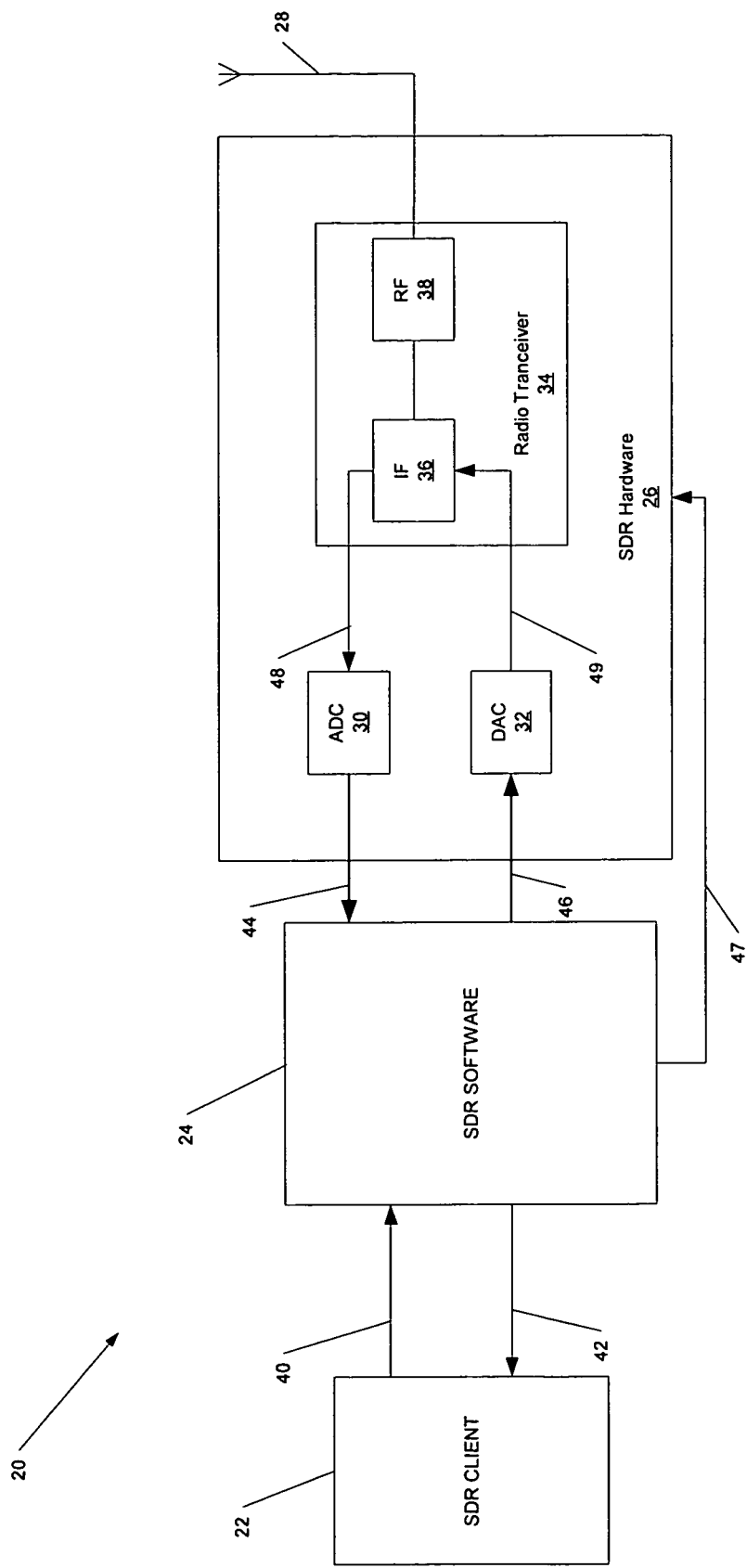
FIG. 1 is a block diagram of a prior art SDR system.

The drawings are not necessarily to scale, emphasis instead generally being placed upon illustrating the principles of the invention.

DETAILED DESCRIPTION

It should be understood that, in the following detailed description, detailed explanations are not provided in every instance for terms of art that can be located and explained in the aforementioned and incorporated-by-reference SCA specifications. For example, the definitions of the XML elements of the Software Assembly Descriptor (SAD) file and other descriptor files are not necessarily provided herein, as one of skill in the art will be expected either to know such a definition already or to have the ability to refer to the aforementioned, publicly available SCA specification to obtain such information.

In addition, in the following discussion, for clarity of description, exemplary listings of actual code used, in accordance with one embodiment of the invention, to implement the various interfaces (e.g., the interface definition language (IDL)), for example the core framework (CF) PreParsers IDL code, is not provided as part of the body of the text or in the drawings, except for the limited excerpts of code and/or file listings provided in FIGS. 13A through 19. Rather, such code listings are provided as part of the included computer program appendix.

Figure 3A:
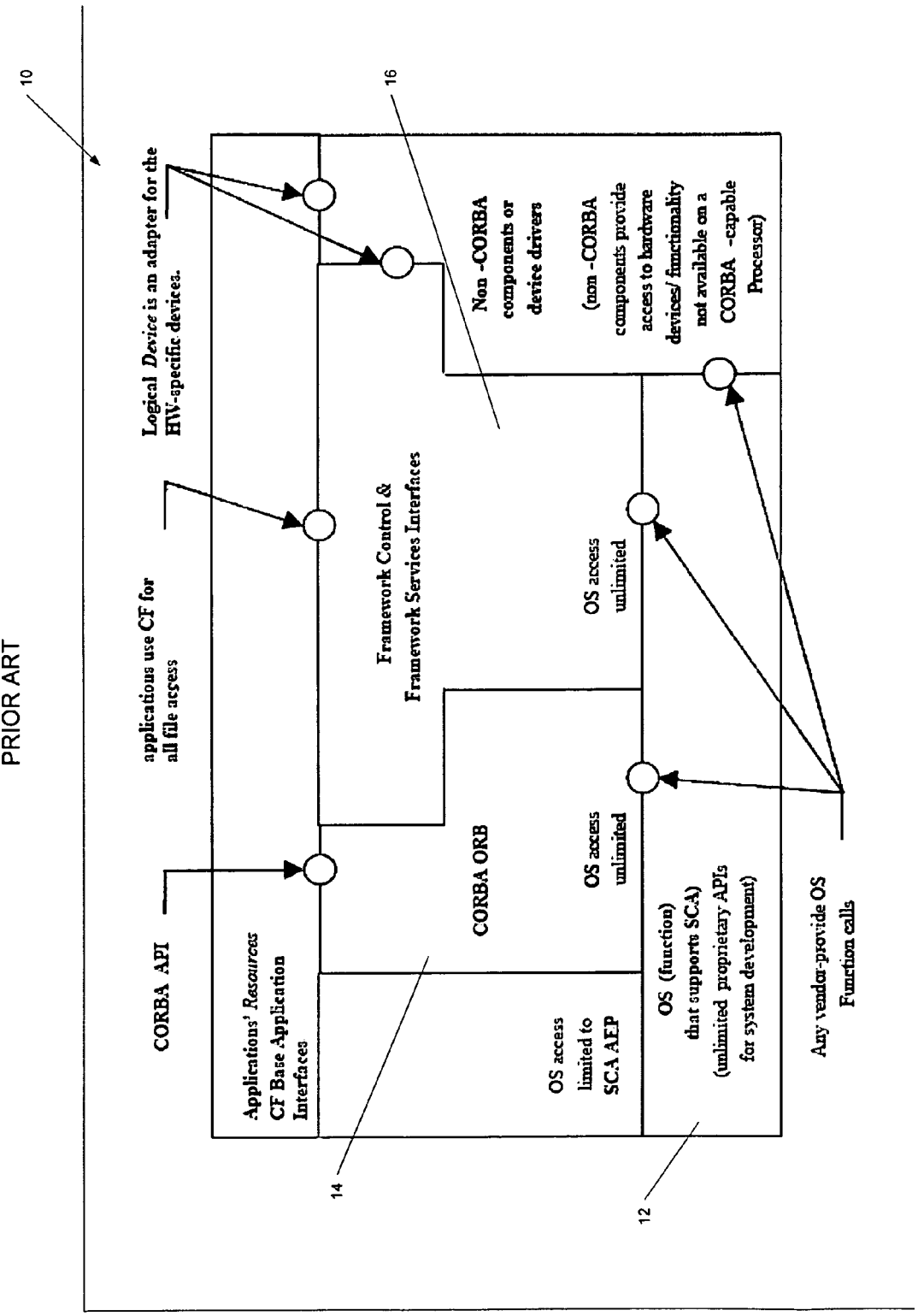
FIG. 3A is a block diagram of a prior art SCA architecture, illustrating showing the structure of its software architecture.
Figure 3B:
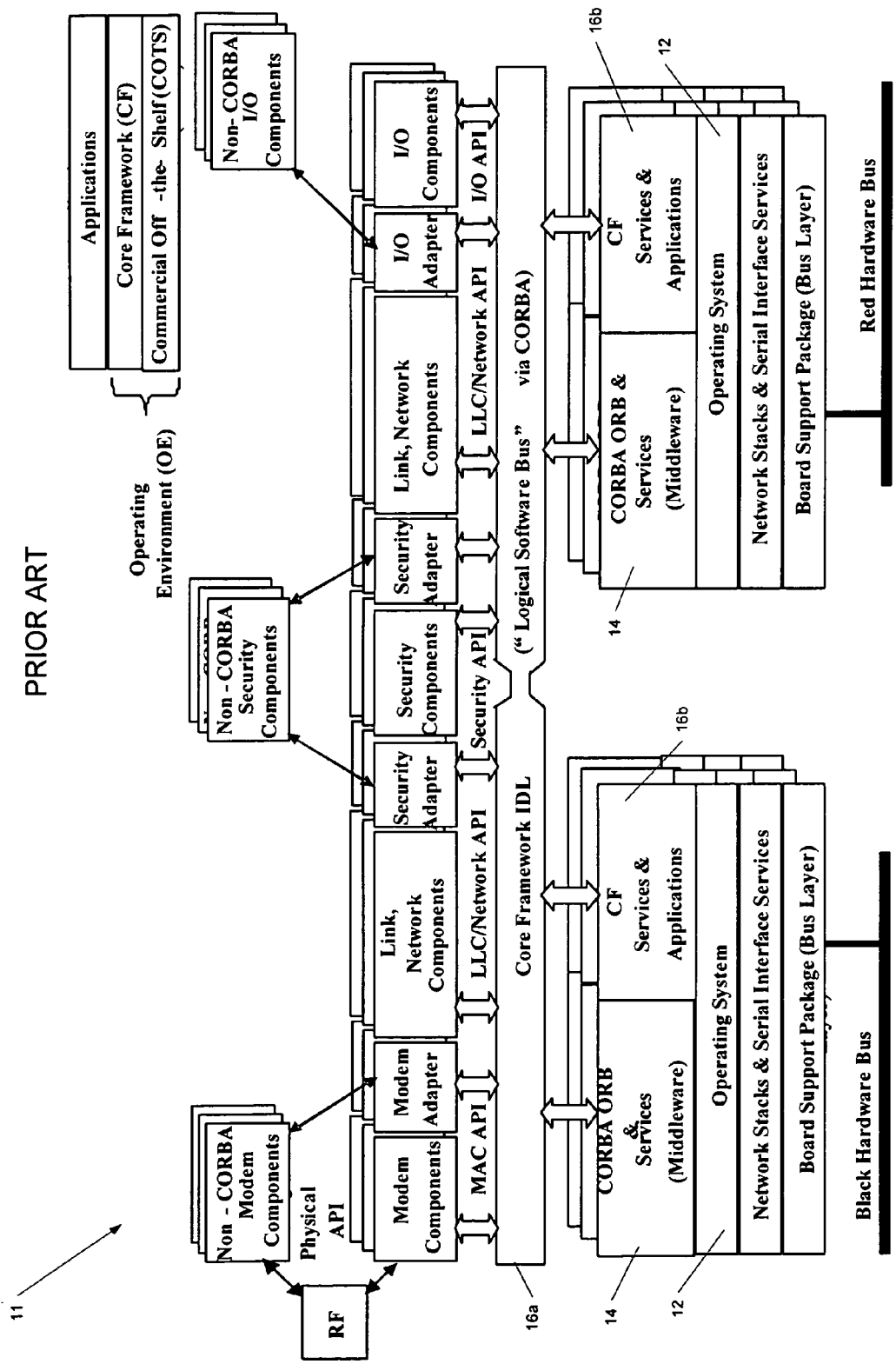
FIG. 3B is a block diagram showing the core framework (CF) layer interface definition language (IDL) relationships of the prior art architecture of FIG. 3A.
Figure 4:
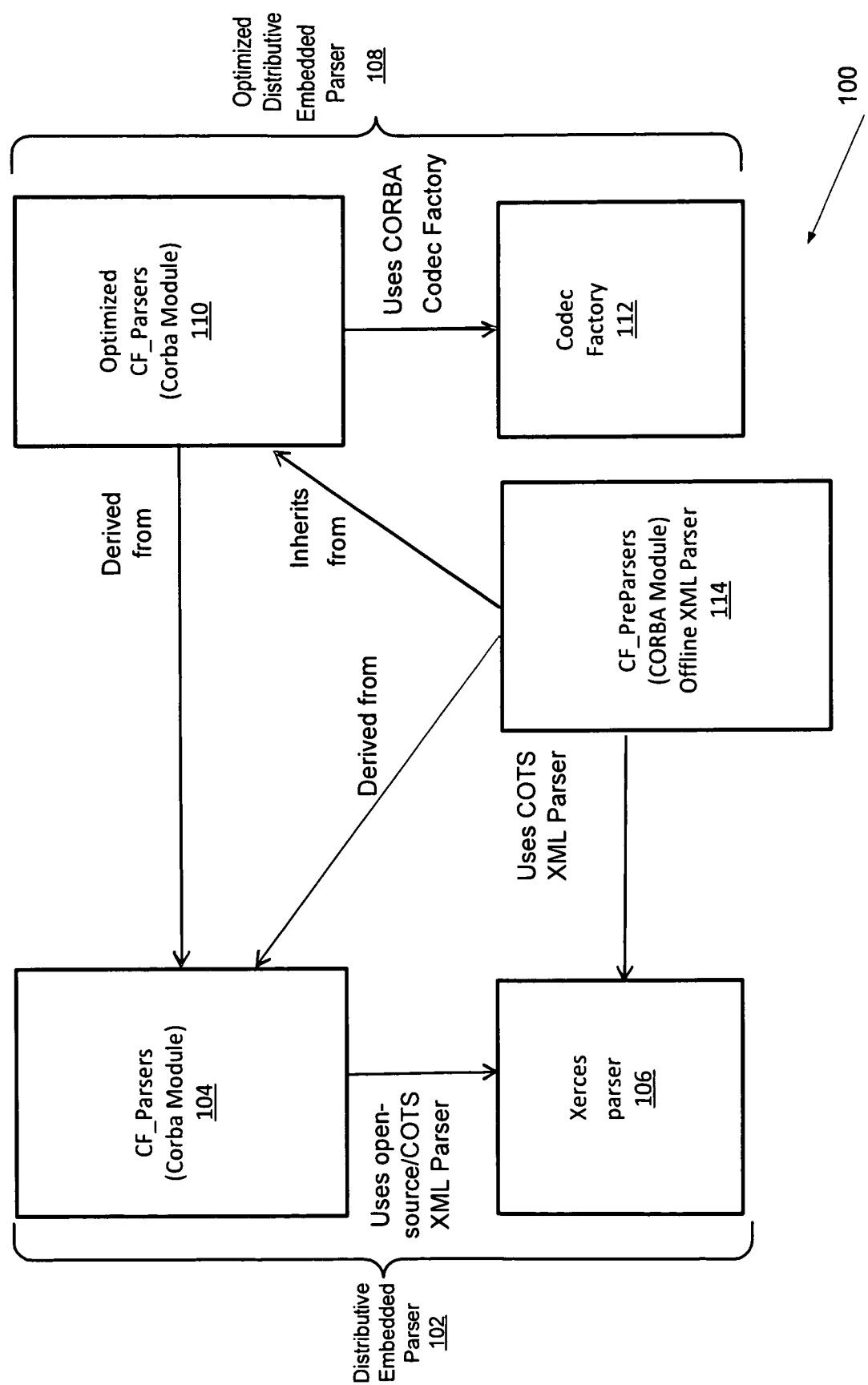
FIG. 4 is a high-level block diagram showing the components of at least one embodiment of the invention and further illustrating this embodiment's comparison with and derivation from the prior art system of FIGS. 3A and 3B and also its derivation from certain portions of the aforementioned U.S. Pat. No. 7,367,020.

Several illustrative embodiments of the invention will now be described. Referring now to the figures, FIG. 4 is a high-level block diagram 100 showing the components of at least one embodiment of the invention and further illustrating this embodiment's comparison with and derivation from the prior art system of FIGS. 3A and 3B. As FIG. 4 illustrates, the prior art system of FIGS. 3A and 3B (which system was described more particularly in the aforementioned '020 patent), includes a distributed embedded parser 102, which includes a CF_Parsers module 104 that uses as its XML parser an open-source or COTS XML parser 106, which is illustrated by way of example only as being a Xerces parser.

In contrast, the optimized distributive embedded parser 108 of this embodiment of the invention is at least partially derived from the distributed embedded parser 104 of the aforementioned '020 patent, but, as will be explained further below, operates differently because it is, in fact, a CORBA parser. In addition, as explained further herein, the optimized distributed embedded parser 108 provides an optional local interface. The optimized distributed embedded parser 108 does not directly use the COTS XML parser 106 to perform XML parsing of the any XML files that require parsing (e.g., application XML files, Domain Profile files, Software Assembly Descriptor (SAD) files, device managers, etc.) within the SCA. Instead, as will be explained in further detail herein, the optimized distributed embedded parser 108 uses certain features of CORBA, along with a new CF_PreParsers Offline XML parser 114 (see FIGS. 5-12), to achieve XML parsing within the SCA environment.

Referring again to FIG. 4, the optimized distributed embedded parser 108 includes an optimized CF_Parsers module 110 and the pre-parsed information from a new CF_PreParsers Offline XML parser 114 that inherits from the optimized CF_Parsers module and uses this information, along with certain functionality of the CORBA Codec Factory 112, to (effectively) replace the prior art COTS XML parser 106 functionality with a new functionality able to parse XML files without requiring that an XML parser be part of the embedded SCA environment. That is, in accordance with at least one embodiment of the invention, no XML parsing takes place within the SDR system. Note that the CF_PreParsers Offline XML parser 114, as described further herein, can be configured, in accordance with one or more embodiments of the invention, to run on any type of computer configuration, including but not limited to computer systems 50 such as those described in connection with FIG. 2, herein. In addition, the Optimized CF_Parsers 110, as described further herein, can be configured, in accordance with one or more embodiments of the invention, to run within the SDR environment (e.g., the SDR system 20 of FIG. 1, in particular as part of the SDR software component 24 and/or the SDR client 22).

Figure 5A:
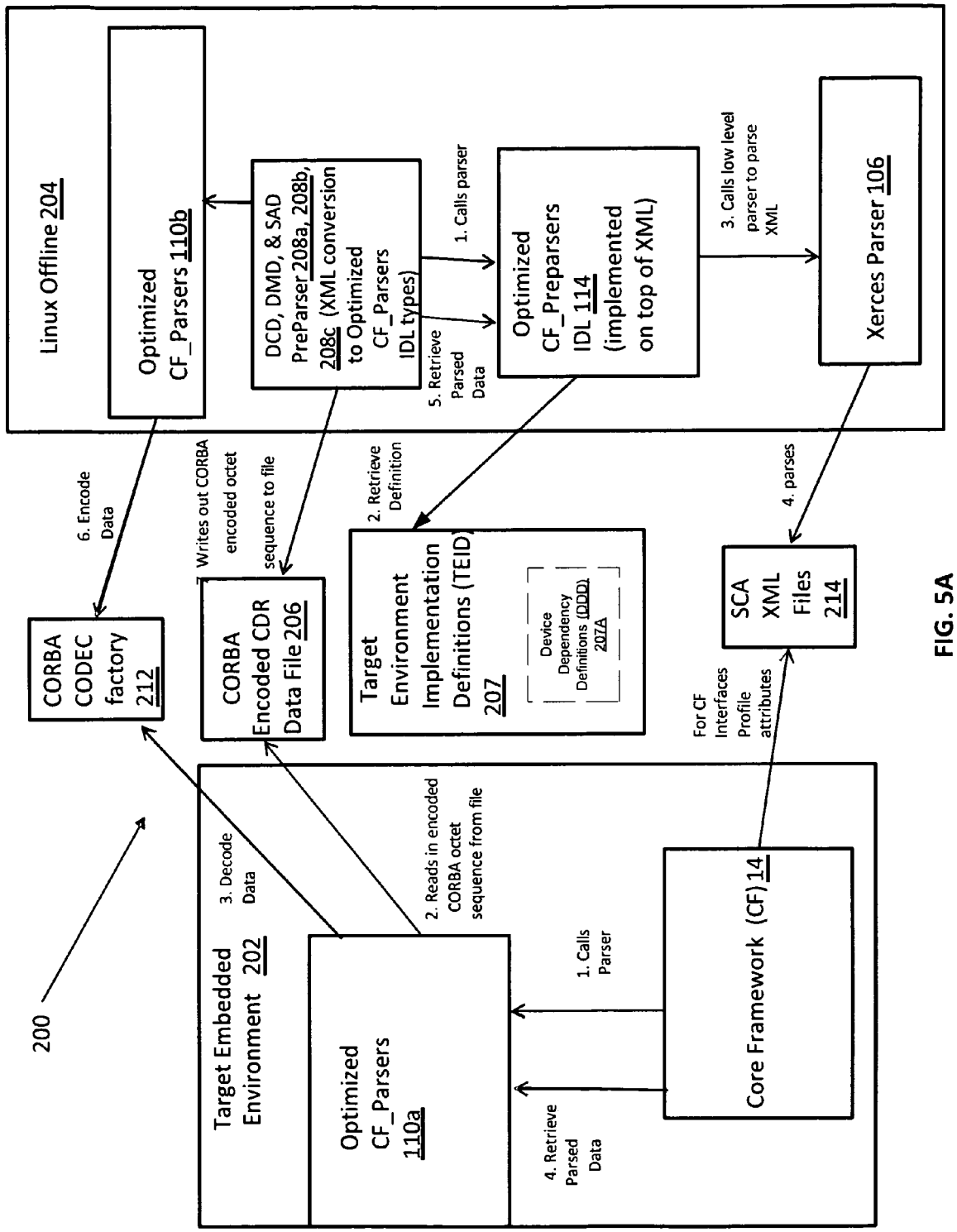
FIG. 5A is a system block diagram of one embodiment of the invention, including an illustration of the Target Environment Implementation Definitions.

FIG. 5A is a system block diagram 200 of one embodiment of the invention, including illustrations of interactions between the embedded 202 and offline 204 environments. Note that the interactions within the embedded 202 and offline 204 environments are detailed further in FIGS. 9A and 10A, respectively. Referring again to FIG. 5A, the system 200 includes a Target Embedded Environment 202 and an Offline Environment 204. The Target Embedded Environment 202 is the actual SDR system, radio or other hardware device on which at least a portion of the SCA system 200 is running, i.e., the SCA environment, and can, for example be implemented as part of an SDR system 20 like that shown in FIG. 1. The Offline environment 204 is illustrated in FIG. 5A as being implemented on a computer environment running the Linux operating system, such as an x86 platform running Linux. However, this should not be understood to be limiting. As those of skill in the art will appreciate, other types of computers/processors running other types of operating systems (such as computer systems 50 described in connection with and shown in FIG. 2), e.g., Windows, Unix, Solaris, HP-UX, Mac OS X, Android, Symbian, etc., are, of course, usable to implement the Offline Environment 204, as will be appreciated by those of skill in the art.

The Target Embedded Environment 202 of FIG. 5A includes the core framework (CF) 14, and an Optimized CF_Parsers 110a (which is based on CORBA Interfaces and types). Both the Target Embedded Environment 202 and the Offline Environment each include an Optimized CF_Parsers module 110 (i.e., Optimized CF_Parsers 110a in the Target Embedded Environment 202 and Optimized CF_Parsers 110b in the Offline Environment 204), where, as one of skill in the art would appreciate, the interface and functionality are adapted for the given environment (i.e., the same code is used for the different environments). The Target Embedded Environment 202 has access to a CORBA encoded CDR Files 206 (i.e., a file in a CORBA Common Data Representation (CDR)) that is created at the Offline environment 204 (this is explained more fully herein). In addition, the Target Embedded Environment 202 has access to the CORBA CODEC Factory 212 (for decoding data) and a set of SCA XML files 214. Note that the SCA XML Files 214 are still required as being provided in this embodiment, even though nothing is done with them, because the SCA has defined CF interfaces that reference such SCA XML files. However, in this embodiment of the invention, all that is done with the SCA XML files 214 is giving such SCA XML files 214 out on profile attribute CF interface operations. The Optimized CF_Parsers 110a of the Target Embedded Environment 202 is in operable communication with and uses the CORBA CODEC factory 212 during a CORBA decode operation, as described further herein. The target embedded environment 202 may, of course, include other elements, but for simplicity these elements are not shown here.

The Offline environment 204 is an environment defined to be external to, and distinct from, the Target Embedded Environment 202, and can be implemented and run on a computer system (e.g., a computer system similar to that of FIG. 2) that is separate/remote from the Target Embedded Environment 202. In one embodiment, the Offline Environment 204 and the Embedded Environment 202 are located on physically distinct and separate computer systems. That is, the Offline environment 204 is an environment defined by the fact that it runs independently from the embedded environment 202, although the Offline environment 204 advantageously is able to create an encoded file (i.e., the CORBA Encoded CDR Data File 206) that will be accessible to the Embedded environment 202. This does not necessarily require that the Offline Environment 204 be in operable or direct communication with the Embedded environment 202. Rather, as one of skill in the art will appreciate, there are various mechanisms to enable the file that is encoded by the Offline environment to be made accessible to the Embedded environment 202. For example, in one embodiment, the CORBA Encoded CDR Data File 206, created on the Offline environment 204, can be installed, moved, or copied to the Embedded environment 202. In a further embodiment, the CORBA Encoded CDR Data File 206 created in the Offline environment 204 is put in a remote location where the Embedded environment 202 can remotely access it. For example, the Embedded environment 202 and Offline environment 204 can communicate through a third party service, such as a network filing service (NFS), to enable the Embedded environment 202 to access the CORBA Encoded CDR Data File 206.

The Offline Environment 204 includes an Optimized CF_Parsers IDL interface 110b and provides a PreParsers Tool for at least one embodiment of the invention. The Offline Environment 204 also includes: a set of Device Configuration Descriptor (DCD), Domain Manager Configuration Descriptor (DMD) and Software Assembly Descriptor (SAD) SAD PreParsers 208a, 208b, 208c, respectively; a CF_PreParsers Interface Definition Language (IDL) 114 that is implemented on top of XML, and a low level parser 106 to parse the XML, shown by way of illustration and not limitation as being the Xerces XML parser 106, where the low level parser receives and parses SCA XML files 202. The CF_PreParsers IDL 210 definition is based upon the optimized CF_Parsers 110b definition, so the same parser types are used, thus making the Optimized CF_PreParsers tool 114 more efficient. The Linux Offline environment 204 in which the Optimized CF_PreParsers Tool 114 is disposed also has access to the CORBA CODEC factory 212 and the SCA XML files 214 and generates the CORBA Encoded CDR Data File 206 (the CORBA CODEC factory 212, CORBA Encoded CDR Data File 206, and SCA XML Files 214 all are shown, for illustrative and not limiting purposes only, as being external to the Offline Environment 204). The DCD, DMD, and SAD PreParsers 208a, 208b, 208c, respectively, convert DCD, DMD and SAD XML files, respectively, into DCD, DMD, and SAD CORBA encoded files (CDR) 206, respectively. This conversion is explained further herein, in connection with FIGS. 6-12.

Referring to FIG. 5A, the Offline environment 204 also has, in certain embodiments of the invention, access to a set of Target Environment Implementation Definitions (TEID) 207, where the TEID 207, in at least some embodiment, also includes a set of Device Dependency Definitions (DDD) 207A. The inclusion and use of the TEID 207 and its included DDD 207A are features in FIG. 5A that differ from and expand upon the aforementioned '061 patent application, as will be explained herein. Advantageously, in at least some embodiments, when the XML information of the SCA software package descriptor (SPD) XML files is converted into CORBA software implementation dependencies during preparsing, the conversion is done such that the software implementation dependencies associated with each component (e.g., visible and external device dependencies, and software dependencies) are each converted to a respective correct type with correct precedence order, so that no further conversion is necessary when the converted XML file used with a radio or other SDR system.

Note that these component dependencies include dependencies against the device, which are, in SCA terms, visible and external types of device dependencies; and software dependencies, which are similar to libraries that need to be loaded before the component code is loaded, so that it can execute correctly. Referring again to FIG. 5A, the DDD 207A, which in one embodiment are included within the TEID 207 (but also could be implemented separately), includes all software dependencies together, including both visible and external device dependencies. In at least one embodiment, the DDD 207A is an SCA XML properties file that has all the allocation properties that describe a device (e.g., all visible and external device properties) and is used for device dependencies. That is, the DDD 207A correspond to allocation properties definitions in the SCA.

As is known in the art, "visible" means visible to the CF application factory (which itself is not shown in FIG. 5A, but known in the art and explained further in the aforementioned, incorporated-by-reference SCA Specification at section 3.1.3.2.1). That is, the CF application factory can use those "visible" dependencies directly for determining what device is capable of handling that dependency. In contrast, with "external" device dependencies, the CF application factory has to delegate that responsibility of determining whether a device is capable of handling a given dependency, to an appropriate device that indicates they have those types of device properties. A given component implementation also can have dependencies to other implementations (e.g., library dependencies (SPD implementations)). In accordance with at least some embodiments of the invention, all of the dependencies are collapsed into one set of device dependencies and one set of software dependencies, usable by the CF_Preparsers 114, where in the set of device dependencies, the set of visible dependencies is distinguished from the set of external device dependencies.

In contrast, in the prior art, during runtime, CF_Properties type is formed up by the CF_PreParser into a list that is used to encapsulate all the allocation properties that a device is managing, and as the CF_Properties type is formed, data must be converted into the correct types, because the device interface is expecting the input of its allocatecapacity operation to have properties in the correct format. However, with at least some of the embodiments described herein, the forming up of the CF_Properties type, including data converted into the correct types, is done offline, saving considerable time and processing resources.

Referring still to FIG. 5A, the TEID 207 includes information that tells the CF_Preparser 114 about the target environment, so that the CF_Preparser 114 can determine the device definitions being used and can put the pre-parsed information into the correct format. For example, for each processing environment in which a software defined radio (SDR) is implemented (e.g., FIG. 1), there can be different processing elements, like digital signal processors (DSP), general purpose processors (GPP), field programmable gate arrays (FPGA), etc. Each type of processing element has its respective set of characteristics and capacities that describe that processing environment. Those characteristics must be taken into account during processing that occurs at runtime of the SDR. The TEID 207 describes this set of characteristics and capacities. Different targets can have different corresponding TEIDs 207. An Exemplary TEID 207 is described further below in connection with FIGS. 13A-13B, and the corresponding Device Implementation files are described further below in connection with FIGS. 14-18.

In one embodiment, the TEID 207 is provided as part of a software package descriptor (SPD) describing the different processing elements used. For example, in one embodiment, the TEID comprises an SPD XML file that comprises at least one set of device definitions for a device used in the target environment. The SPD XML device definitions, in one embodiment, include an allocation property for a device and can, in a further embodiment, include a reference to a Device Implementation, the Device Implementation having a reference to a property file describing at least one allocation property for the device. FIGS. 13A-13B are a listing of an exemplary TargetEnvironment Software Package Descriptor (SPD) XML file, in accordance with one embodiment of the invention. The TargetEnvironment SPD XML file of FIGS. 13A-13B corresponds, in at least one embodiment of the invention, to the TEID 207 of FIG. 5A. Each implementation element listed in the TargetEnvironment SPD XML file defines a corresponding platform device definition, which, as those of skill in the art recognize, are the corresponding device's allocation properties. FIGS. 14-18 illustrate an exemplary set of Device Implementation files, as referenced by the TargetEnvironment SPD xml, for devices that include a General Purpose Processor (GPP), Digital Signal Processor (DSP), Field Programmable Gate Array (FPGA), Audio Device, and Serial Device.

Note that, as is known in the art, the SPD is used at deployment time to load a component and its various implementations. The information contained in the SPD provides the basis for the domain management function to manage the component within the SCA architecture. The aforementioned SCA Specification, version 2.2.2., at Appendix D, section D.2, provides more information about the SPD. An exemplary SPD includes a softpkg element that has a set of properties that includes these elements:

```
<!ELEMENT softpkg
    ( title?
    , author+
    , description?
    , propertyfile?
    , descriptor?
    , implementation+
    , usesdevice*
)>
<!ATTLIST softpkg
    id      ID      #REQUIRED
    name    CDATA   #REQUIRED
    type    (sca_compliant | sca_non_compliant)
    "sca_compliant"
    version CDATA   #IMPLIED >
```

As noted above, the SPD can specify more than one implementation element (only one is illustrated above), although only one is applicable at a time in a given hardware element. That is, an implementation is specific to a processor and/or an operating system. Referring briefly to FIG. 19, FIG. 19 is a listing of an exemplary Component Software Package Descriptor (SPD) that specifies more than one implementation element, in accordance with one embodiment of the invention.

In addition, the above-mentioned implementation element itself can have software dependencies, and those can include a list of software dependencies. As is specified in Appendix D of the aforementioned SCA Specification, at D.2.1.6, the implementation element allows the same component to support different types of processors, operating systems, etc. An exemplary implementation element includes:

```
<!ELEMENT implementation
    ( description?
    , propertyfile?
    , code
    , compiler?
    , programminglanguage?
    , humanlanguage?
    , runtime?
    , ( os | processor | dependency )+
, usesdevice*
    )>
<!ATTLIST implementation
    id              ID #REQUIRED
    aepcompliance   (aep_compliant | aep_non_compliant)
    "aep_compliant">
```

For example, FIGS. 14-19 are listing of exemplary Device Implementation files, in XML format, that are usable with the TargetEnvironment SPD XML file of FIGS. 13A-13B, in accordance with one embodiment of the invention. FIG. 14 is a listing of a first exemplary Device Implementation file, GPPDevice.prf.xml, FIG. 15 is a listing of a second exemplary Device Implementation file, DSPDevice.prf.xml, FIG. 16 is a listing of a third exemplary Device Implementation file, FPGADevice.prf.xml, FIG. 17 is a listing of a fourth exemplary Device Implementation file, AudioDevice. prf.xml, FIG. 18 is a listing of a fifth exemplary Device Implementation file, SerialDevice.prfxml, and FIG. 19 is a listing of an exemplary Component Software Package Descriptor (SPD) that specifies more than one implementation element exemplary each in accordance with one embodiment of the invention.

Each implementation element in the TargetEnvironment SPD file of FIGS. 13A-13B defines a platform device definition, which are the device's allocation properties. Each Device Implementation (i.e., FIGS. 14-18) references a property file that describes the allocation properties. As one of skill in the art will recognize, the exemplary TargetEnvironment SPD XML file of FIGS. 13A-13B effectively is collapsing a set of Device Manager Device Configuration Descriptor (DCD) files into a TargetEnvironment SPD XML file, which is much easier to process.

Within this above-referenced exemplary implementation element, for example, the optional os and processor elements, each has corresponding attributes that are defined in a corresponding property file as corresponding allocation properties, and each of the os and processor elements is interpreted as a dependency for the software component. These and other applicable allocation properties and dependencies for elements are known to those of skill in the art and explained further in the SCA Specification. In accordance with at least one embodiment of the invention, dependencies such as these are put into one device dependency list, based on the source XML file of the property. This is described further herein. In addition, the dependency element (of the implementation element) can itself refer to a softpkgref element (not shown above), i.e., a softpkg contained in another SPD and having a file-load dependency on that file (that is, the implementation can refer to other software SPDs for its dependencies).

These other dependencies are, in accordance with the embodiments of the invention described herein, also collapsed into a single precedence order list in order of loading dependency software. An SPD may have more than one implementation element that can be specified, but only one implementation element is applicable within the given hardware environment (e.g., SDR) in which it is being used (SPDs and implementation elements are explained further below). For example, referring to the TargetEnvironment SPD XML file of FIGS. 13A-13B, although this file references the General Purpose Processor (GPP) as well as a Field Programmable Gate Array (FPGA), only one of these implementations is applicable within a given target environment. The CF_Preparsers 114 (FIG. 5A), by using information contained in the TEID 207 (as described further herein), uses only the implementations from a given SPD file that are applicable to the given hardware environment. That is, the TEID 207 (e.g., the TargetEnvironment SPD XML file) tells the CF_Preparsers 114 which implementations to use.

Each software dependency may have specific device dependencies associated with it. These software dependency's device dependencies are merged together into one implementation device dependencies list (part of Device Dependency Definitions 207A). The implementation device dependencies list is separated into 2 parts: visible device dependencies and external device dependencies. The Optimized CF_Preparsers IDL 114 converts the external device dependencies to the proper SCA CF::Properties type by using the provided input device allocation property definitions. The CF_Preparsers IDL 114 also converts the visible device dependencies to the proper device allocation type and equality operator by using the provided input device allocation property definitions. Advantageously, in one embodiment, for a software component being loaded as part of the preparsing, the component instantiation's implementation device dependencies is a single implementation device dependencies list having a first part that includes visible device dependencies and a second part that includes external device dependencies.

A component instantiation's implementation usesdevice dependencies (the usesdevice element describes a "uses" relationships a given component has with a device in a system) also is separated into 2 parts: visible device dependencies and external device dependencies. The CF_preparser 114 converts the usesdevice external device dependencies to the proper SCA CF::Properties type by using the aforementioned provided input device allocation property definitions. The CF_Preparser 114 converts the usesdevice visible device dependencies to the proper device allocation type and equality operator by using the provided input device allocation property definitions.

Note that "visible device dependencies" are visible device allocation properties (whose action type is not external) that the CF Application Factory can use directly to determine if device can satisfy a device dependency. External device dependencies are device external allocation properties (whose action type is external) that the CF Application uses with a Device's allocate capacity operation to determine if a device can satisfy an implementation dependency.

Thus, a component instantiation's implementation software dependencies are formed into a single precedence order list in order of loading dependency software. A component instantiation's implementation executable software dependency is converted to a component instantiation element.

Figure 5B:
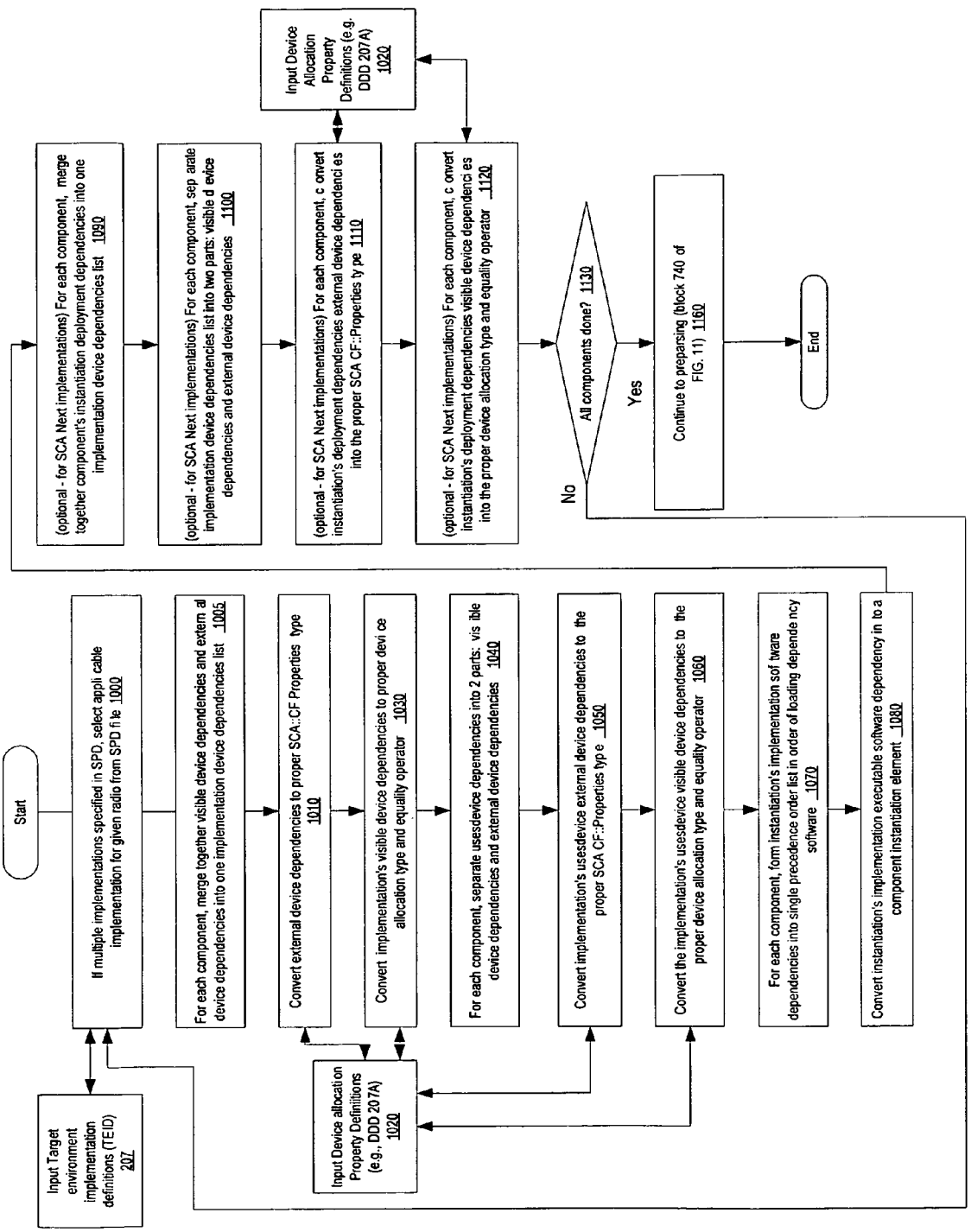
FIG. 5B is a flow chart showing conversion of software implementation dependencies associated with each component to a respective correct type with correct precedence order, in accordance with one embodiment of the invention.

FIG. 5B is a flow chart showing conversion of software implementation dependencies associated with each component to a respective correct type with correct precedence order, in accordance with one embodiment of the invention. In the flow chart of FIG. 5A, it should be understood that the steps as illustrated therein are not required to be in a particular order. As those of skill in the art will appreciate, however, in at least one embodiment, it is advantageous for at least certain steps to occur before other steps. For example, in one embodiment, the merging of the component's instantiation dependencies (e.g., as recited in block 1005 or block 1090, respectively) advantageously occurs prior to converting the types to SCA properties (e.g., as recited in block 1010 or block 1110, respectively).

Referring to FIGS. 5A and 5B, for each component, if multiple implementations are specified in the Software Package Descriptor (SPD), the applicable implementation is selected for a given radio from the SPD file (block 1000). The Target Environment Implementation Definitions (TEID) 207 is used to help select the applicable implementation. The component instantiation's implementation software dependencies device dependencies are merged together into one implementation device dependencies list (block 1005). Advantageously, in one embodiment, there is only one set of device dependencies for a given application component implementation. As noted above, the implementation device dependencies list is separated into 2 parts: visible device dependencies and external device dependencies. The implementation's external device dependencies are converted (e.g., by CF_PreParser 114) to the proper SCA CF::Properties type (block 1010) by using the provided input device allocation property definitions (block 1020). The implementation's visible device dependencies are converted (e.g., by CF_Preparser 114) to the proper device allocation type and equality operator (block 1030) by using the provided input device allocation property definitions (block 1020).

In addition, for each component, the component instantiation's implementation usesdevice dependencies are separated into 2 parts: visible device dependencies and external device dependencies (block 1040). The implementation's usesdevice external device dependencies are converted (e.g., by the CF_PreParsers 114) to the proper SCA CF::Properties type (block 1050) by using the provided input device allocation property definitions (block 1020, which are, effectively the Device Dependency Definitions 207A of FIG. 5A). The implementation's usesdevice visible device dependencies are converted (e.g., by the CF_PreParsers 114) to the proper device allocation type and equality operator (block 1060) by using the provided input device allocation property definitions (block 2010). Note that the equality operator refers to the action element in the property elements (see D.4.1.1.7 in SCA Specification).

For each component (i.e., an application component implementation), the component instantiation's implementation software dependencies are formed into a single precedence order list in order of loading dependency software (block 1070). For each component, the component instantiation's implementation executable software dependency is converted to a component instantiation element (block 1080). As is known to those skilled in the art, all component instantiation elements are code that gets executed, and, via the actions taken in blocks 1070 and 1080, the elements are formed up in correct order.

The actions detailed in blocks 1090 through 1120 are optional actions that are applicable to embodiments of the invention implemented using the SCA Next specification, as SCA Next includes the concept of deployment dependencies at the Software Assembly Level for an application. Referring again to FIGS. 5A and 5B, in optional black 1090, for each component, the component instantiation's deployment dependencies are merged together into one implementation device dependencies list (As previously noted the implementation device dependencies list is separated into 2 parts: visible device dependencies and external device dependencies). For each component, the component instantiation's deployment dependencies external device dependencies are converted (e.g., by CF_PreParser 114) to the proper SCA CF:: Properties type (optional block 1100) by using the provided input device allocation property definitions (block 1020). For each component, the component instantiation's deployment dependencies visible device dependencies are converted to the proper device allocation type and equality operator (optional block 1120) by using the provided input device allocation property definitions (block 1020).

The operations in blocks 1000 through 1080 (and, optionally, if applicable, blocks 1090 through 1120) are repeated for all components (block 1130). That is, the same target environment and device dependencies are used for all components. When a component is done, the implementation is formed by combining and collapsing the information that results in blocks 1070, 1080 (and, optionally, 1110 and 1120), into an implementation element usable in the SPD. When all component are done (block 1130), processing proceeds to preparsing (e.g., to block 740 of FIG. 11, discussed further herein) (block 1160).

(This is more particularly illustrated in the included computer program listing in the CF_Preparsers IDL, at about page 7). As those of skill in the art know, in XML there is a precedence of software implementation dependencies, and the pre-processing done in the offline environment 204 handles the precedence order for each software dependency to ensure that the software dependency obeys the precedence list requirement. The software implementation dependencies is well understood by those of skill in the art and is understood in connection with the rules specified in SCA version 2.0, section D.6.3.1.2 (as well as SCA 2.2/2.2.2 section D.6.1.3.3), concerning device dependencies and software dependencies. Furthermore, the SCA's precedence rule for properties (specified at D.2.1) is independent of the version of SCA that is in use for any version of SCA 2.0 and above.

Figure 6:
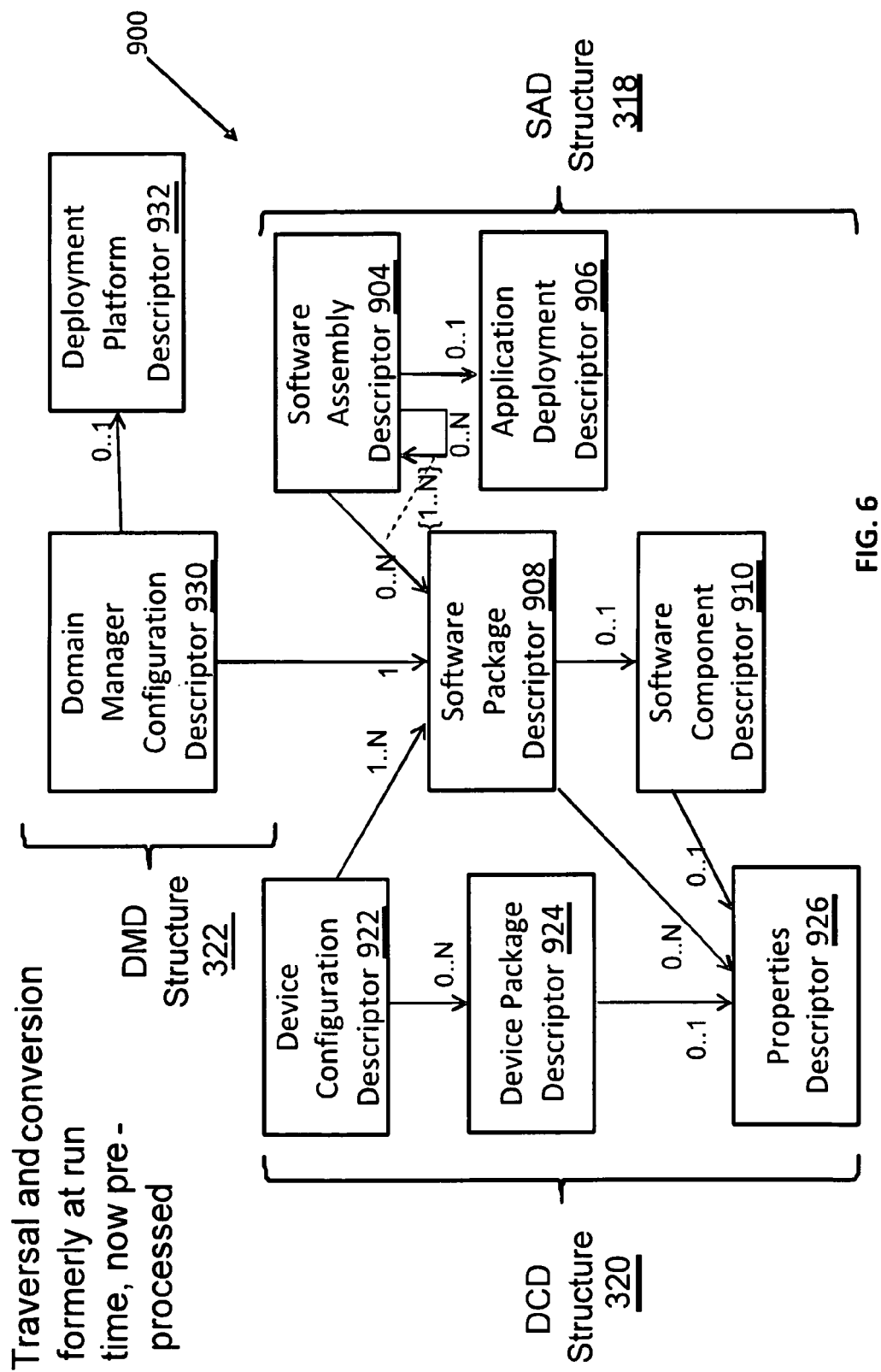
FIG. 6 is a block diagram illustrating relationships between SCA XML files to CORBA structures, in accordance with one embodiment of the invention.

Referring again to FIGS. 4 and 5A, in accordance with one embodiment of the invention, the basic CF_Parsers IDL 104, as described in the aforementioned incorporated by reference '020 patent, is adapted and modified in at least some embodiments of the present invention to become a CF_PreParsers module/tool 114 as well as an Optimized CF_Parsers 110*a*, 110*b*, so that it instead converts XML into CORBA types, then puts the CORBA types into a CORBA structure, where the information is stored into new types that capture condensed/collapsed information into a CORBA structure (i.e., a SAD structure, a DCD structure, and a DMD structure) (explained further in connection with FIG. 6). The SAD structure, DCD structure, and DMD structure are all CORBA structure types that are based upon existing CF_Parsers CORBA types and are shown and defined in FIGS. 6-12, described further below. In addition, at least some embodiments of the invention take advantage of certain features of CORBA, such as the CORBA CODEC factory 212 and CORBA Anys. For example, it is known that the CORBA CODEC factory 212 provides encode/decode behavior, so this CODEC factory 212 feature can be used to encode a CORBA_Any into an octet sequence, which can be written out to an encoded CORBA file. This is described further herein, especially in connection with FIGS. 8-11.

In addition, note that the computer program listing appendix on CD that accompanies this filing, which CD and its contents are incorporated by reference, includes several non-executable, illustrative files (provided for illustrative purposes only in Microsoft WORD format) that list the text of several IDLs and other files that are useful in implementing at least some embodiments of the invention. These files correspond to CORBA IDL files. One of skill in the art will recognize that although the CORBA IDL files are provided as text type documents, the actual textual listings of the IDLs, together with the UML class diagrams of FIGS. 7 and 8 (discussed further below), the known SCA and CORBA specifications, and routine skill in the art, can be used to help generate usable code to implement at least some embodiments of the invention. For example, a CORBA Language (C, CPP, Java) IDL compiler can be used to convert the illustrated IDL into CORBA language mapping client and server files.

As an example, the computer program listing appendix on CD includes a file titled CF_Parsers_IDL.doc, which file provides a textual code listing usable, in accordance with at least one embodiment of the invention, to implement the optimized CF_Parsers 110*a*, 110*b* of FIG. 5A. Similarly, the aforementioned computer program listing appendix on CD includes a file titled CF_PreParsers_IDL.doc, which file provides an exemplary textual code listing usable, in accordance with at least one embodiment of the invention, to implement the CF_PreParsers IDL 114 of FIG. 5A. Similarly, the aforementioned computer program listing appendix on CD includes a files titled DCD_IDL.doc, DMD_IDL.doc, and SAD_IDL.doc, as well as a DeviceConfigurationParser_IDL.doc, DomainManagerConfigurationParser_IDL.doc, and SoftwareAssemblyParser_IDL.doc, which files each provide respective exemplary textual code listings usable, in accordance with at least one embodiment of the invention, to implement the corresponding DCD PreParsers 208*a*, DMD PreParsers 208B, and SAD PreParsers 208*c*, of FIG. 5A. Of course, those of skill in the art will appreciate that these textual code listings are merely exemplary and not limiting.

FIG. 6 is a block diagram 900 illustrating relationships between SCA XML files to CORBA structures, in accordance with one embodiment of the invention, where the traversal and conversion (which functions were done in the prior art at run-time) are now pre-processed, in accordance with an embodiment of the invention. In particular, the preparsing, then collapsing/converting of the SCA XML files to CORBA structures that is shown in FIG. 6 actually takes place in the Offline environment 204, and then the resulting CORBA structures that result are provided to the Target/Embedded environment 202 in the form of encoded octet sequences. Note that the collapsing/converting referred to herein in connection with the CORBA structures includes pre-parsing of the XML files; this will be described further herein in connection with FIGS. 8-12.

Referring to FIGS. 5A and 6, the block diagram 900 of FIG. 6 shows the particular SCA XML files that pre-parsed (e.g., using COTS parser 106) (step #'s 1-4 of Offline Environment 204 of FIG. 5A) then are collapsed together, using, as applicable, the DCD PreParsers tool 208A, the DMD PreParsers tool 208B, and the SAD PreParsers tool 208C, to form the CORBA data structures 206, which structures include a SAD structure 318, a DCD structure 320, and DMD structure 322. Each CORBA structure is encoded into a respective CORBA encoded Common Data Representation (CDR) file 206 (e.g., resulting in the CDR file types SAD.cdr, DCD.cdr, and DMD.cdr) using CORBA CODEC 212 and Any mechanisms (e.g., as shown in step #5 in Offline Environment 304 of FIG. 5A), and written to file as an octet sequence (step #6 in Offline Environment of FIG. 5A). As shown in FIG. 5A, the octet sequence is provided to the CORBA encoded CDR data file 206 in the Embedded Environment 202, which reads in the encoded CORBA octet sequence from the CORBA Encoded CDR Data File 206 (step #2 in Embedded Environment 202 of FIG. 5A) and also uses the CORBA CODEC factory 212 to decode the CORBA Encoded CDR data file (step #3 in Embedded Environment 202 of FIG. 5A) and extract from it the resultant descriptor files (e.g., SAD, DCD, DMD).

Referring again to FIG. 6, the block diagram 900 of FIG. 6 also illustrates, in a manner similar to that used in UML diagrams, the multiplicity relationships between the XML files that are parsed to create the structures. The particular SCA XML descriptors/files of FIG, 6 are not discussed in great detail herein, as those of skill in the art will recognize the functions of and details about each of the types of descriptor files shown in FIG, 6 are discussed in the aforementioned, incorporated-by-reference SCA specification, especially in its Appendix A-Glossary, and also in the SCA 2.2.2 extensions. Note also that the aforementioned SCA Next Specification also provides further information about the descriptor files.

Advantageously, in at least some embodiments, when the XML information of the SCA XML files is converted into CORBA CF property types during preparsing, the conversion is done such that the XML Properties associated with each component (e.g., Configure Properties, Executable Properties, Resource Factory Properties, Options Properties, and other component instance properties) are each converted to a respective correct SCA CF::Properties type, with correct precedence order, so that no further conversion is necessary when the converted XML file used with a radio or other SDR system. The properties returned are converted to the proper CORBA types from their string types (found in XML). (This is more particularly illustrated in the included computer program listing in the CF_PreParsers_IDL.doc, at about page 7). That is, as those of skill in the art know, in XML there is a precedence of four levels for any given property, and the pre-processing done in the Offline Environment 204 handles the precedence order for each property to ensure that the property obeys the precedence list requirement. The precedence order is well understood by those of skill in the art and is understood in connection with the rules specified in SCA version 2.2/2.2.2, section D.6.1.3.3, concerning precedence order.

This technique of converting to SCA CF::Properties type, with correct precedence order, provides efficiency advantages over prior art systems that convert XML information into SCA CF::Properties types during runtime, and also provides advantages over prior art systems that do not convert XML information into SCA CF::Properties types in correct precedence order.

As a first example of creation of a CORBA structure, in accordance with one embodiment of the invention, consider, for example, the DCD structure 320, created using DCD PreParsers tool 208A (an illustrative example of which is documented in the included computer program listing appendix, which forms part of this application, as DCD_IDL. Note that the preparser DCD tool 208A uses this DCD_IDL structure, such that the IDL-generated code becomes part of the tool. With the DCD PreParsers tool 208A, the Device Configuration Descriptor (DCD) 922 and its associated Software Package Descriptors (SPD) 908, Software Component Descriptors (SCD) 910, Device Package Descriptors (DPD) 924 and Properties Descriptor (PRF) 926 XML files are collapsed together so as to be converted into the CORBA DCD structure 320. The CORBA structure is further encoded into CDR and then written to file as an octet sequence, as described above and further herein.

Referring again to FIGS. 5A and 6, an example of the resultant DCD structure 320, when collapsed in accordance with an embodiment of the invention, is shown below and also in FIG. 7, which is a first UML class diagram 300 illustrating the optimized CF Parsers CORBA module interfaces and structures, including various CORBA elements used in their definitions, and provides an overview of the interface relationships, in accordance with one embodiment of the invention. This DCD structure 320 is the structure that represents the collapsing of the DCD XML files after these DCD XML files have been preparsed (i.e., the DCD 922, and its associate DPD 924, PD 926, SPD 908 and SCD 910 XML files) as discussed above in connection with FIG. 6. The DCD structure 320 is the structure that contains the information about a device manager created by the preparser parsing the DCD XML file and is used by the CF_Optimized CF_PreParsers 114.

Referring now to FIGS. 5A-7, in forming the DCD structure 320, the DCD 922 pulls in the 1 to N associated SPDs 908 (i.e., it pulls in however many there are up to "N", but will pull in at least one). In addition, the DCD indirectly pulls in SCDs 910 and PRFs 926, because each of the 1 to N associated SPDs 908 pulled by the DCD 922 will itself pull, for each SPD 908, from 0 to 1 single respective SCDs 910; the DCD 922 also pulls in from 0 to N DPDs 924, and for each of the 0 to N DPDs 924, each respective DPD 924 pulls in from 0 to 1 single respective PRFs 926.

This DCD structure 320 and its illustrated elements is a representation that conveys everything of importance that was contained in the original SCA XML files. As shown in FIG. 7 (and as also included in the computer program listing appendix, in the DCD_IDL file), the exemplary DCD structure 320 includes as elements:

```
id : string [1]
name : string[1]
partitions : PartitionsSequence[1]
connections : ConnectionsSequence[1]
domainManager : string[1]
fileSystemNames : FileSystemNamesSeq[1]
```

This DCD structure 320 is provided as an example usable in accordance with at least some embodiments of the invention and is not intended as limiting. Each of the elements of the DCD structure 320 (as well as the SAD structure 318 and DMD structure 322, discussed further below) will be readily understood by one of skill in the art when viewed in connection with the aforementioned, incorporated-by-reference SCA Specification and the included computer program listing appendix. For example, the domainManager element indicates how to obtain the CF::DomainManager object reference, and the fileSystemNames element indicates the mounted file system names for CF::DeviceManager's FileManager. As will be apparent, advantageously, this DCD structure 320 does not include or require elements/items that have nothing to do with (i.e., are not needed for) deployment and/or that are merely informational elements/items. Thus, in at least one embodiment the DCD structure 320 contains only elements required for deployment in the SCA Core Framework (CF) 16. Of course, one of skill in the art will appreciate that the DCD structure 320 (as well as the SAD structure 318 and DMD structure 322, described further herein) could, in an alternate embodiment, be implemented to include additional items, such as non-deployment items and merely informational items, but the resulting structure might not be as compact as the DCD structure 320 illustrated in FIG. 7. In addition, those of skill in the art will readily be able to determine, for a given deployment, which elements in the DCD structure 320 are not required for that given deployment; this also will be true for the SAD structure 318 and DMD structure 322 further described herein.

Referring again to FIGS. 6 and 7, the SAD structure 318 and DMD structure 322 are formed in a manner similar to that for the DCD structure 320, which method is also discussed further below in connection with FIGS. 8-12. Consider first the SAD structure 318. Using the SAD PreParsers tool 208B (an illustrative example of which is documented in the included computer program listing appendix as SAD_IDL.doc), the Software Assembly Descriptor (SAD) 904 and its associated SADs, SPDs 908, SCDs 910, Application Deployment Descriptors (APDs) 906 and PRF 926 XML files are collapsed together so as to be converted into the CORBA SAD structure 318.

An example of the resultant SAD structure 318, when collapsed in accordance with an embodiment of the invention, is shown below and in FIG. 7. This SAD structure 318 is the structure that represents the collapsing of the SAD XML files as discussed above in a similar manner for the DCD structure 320. The SAD structure 318 is the structure that contains the information created by the pre parser parsing the SAD XML file. The SAD structure 318 is used by the Optimized CF_Parsers 110. The SAD 904 corresponds to the Software Assembly Descriptor (SAD) DTD XML file and the SAD elements map to the concepts in the SAD 318. As with the DCD structure 320, the SAD structure 318 and its illustrated elements is a representation that conveys everything of importance that was contained in the original SCA XMLs. Referring again to FIGS. 6 and 7, in forming the SAD structure 318, the SAD 904 pulls in at least an SPD or an SAD, and there can be N of these; for example, the SAD 904 can pull in the 0 to N associated SPDs 908 (i.e., it pulls in however many there are up to "N", but there may be none). Optionally, the SAD 904 can pull in zero or one SCDs. The SAD 904 must be able to pull in at least one member from one of these two sets SAD and SPD. In addition, each of the 0 to N associated SPDs 908 will itself pull, for each SPD 908, from 0 to 1 single respective SCDs 910. The SAD 904 also pulls in from 0 to 1 Application Deployment Descriptors (ADD) 906.

Figure 7:
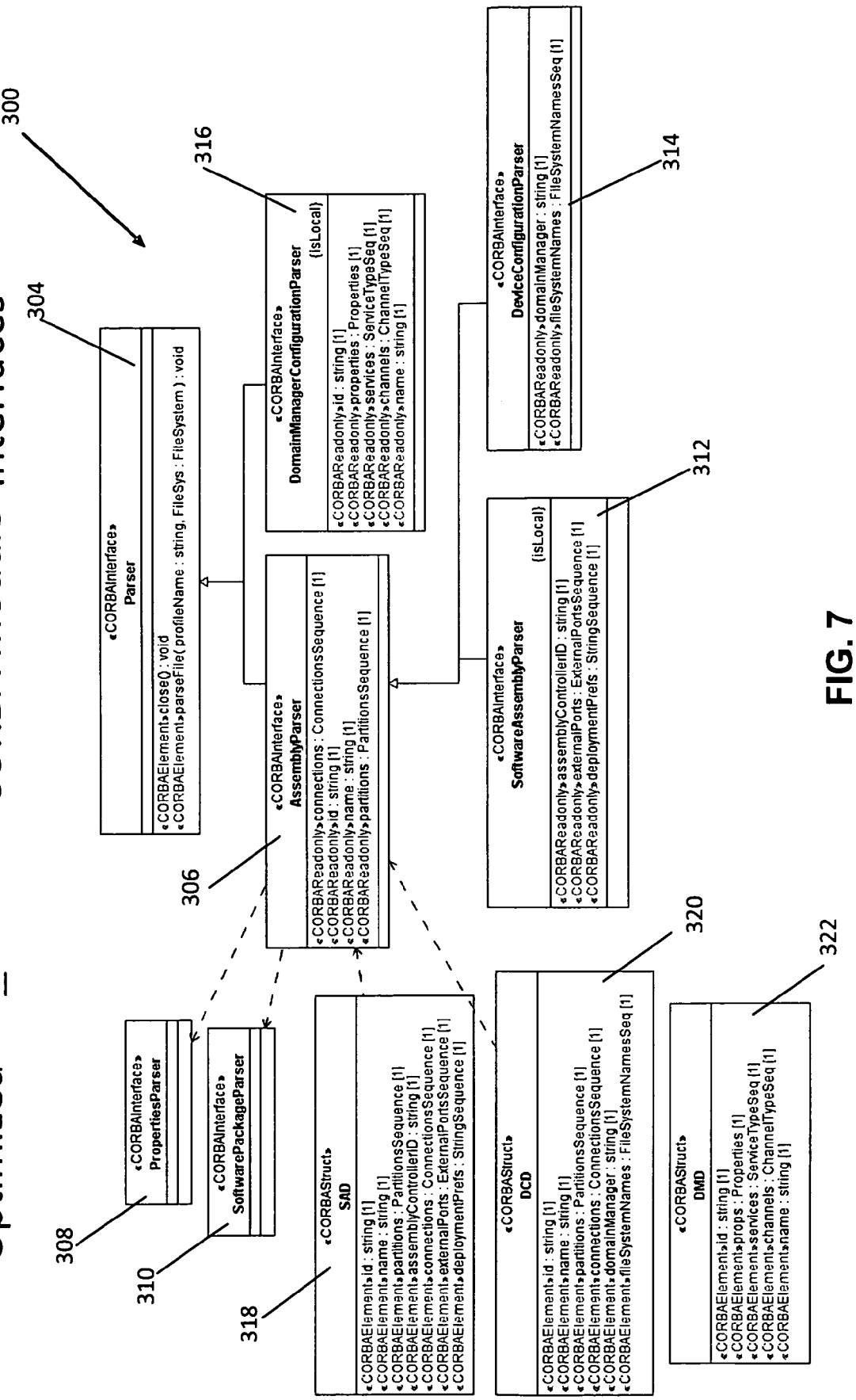
FIG. 7 is a first UML class diagram illustrating the optimized core framework (CF) Parsers CORBA MODULE interfaces, in accordance with one embodiment of the invention.

As shown in FIG. 7 (and as also included in the computer program listing appendix), the exemplary SAD structure 318 includes as elements:

```
id : string [1]
name : string[1]
partitions : PartitionsSequence[1]
assemblyControllerID : string[1]
connections : ConnectionsSequence[1]
externalPorts : ExternalPortsSequence[1]
deploymentPrefs : StringSequence[1]
```

As noted above, each of the elements of the SAD structure 318 will be readily understood by one of skill in the art when viewed in connection with the aforementioned, incorporated-by-reference SCA Specification and the included computer program listing appendix. For example, the readonly assemblyControllerId attribute corresponds to the SAD DTD assemblycontroller element within the SAD file. The readonly externalPorts attribute corresponds to the SAD DTD externalports element with the SAD file. As with the DCD structure 320, the SAD structure 318 advantageously only includes items required for a given deployment and thus does not include or require elements that are unnecessary for deployment and/or that are merely informational.

Referring again to FIGS. 6 and 7, consider next the DMD structure 322. Using the DMD PreParsers tool 208C (an illustrative example of which is documented in the included computer program listing appendix as DMD_IDL.doc), the Domain Manager Configuration Descriptor (DMD) 930 and its associated SPDs 908, SCDs 910, Deployment Platform Descriptor 932, and PRF 926 XML files are collapsed together so as to be converted into the CORBA DMD structure 322.

An example of the resultant DMD structure 322 when collapsed in accordance with an embodiment of the invention, is shown below and in FIG. 7. This DMD structure 322 is the structure that represents the collapsing of the DMD XML files as discussed above in a similar manner for the DCD structure 320. As with the DCD structure, the DMD structure 322 and its illustrated elements is a representation that conveys everything of importance that was contained in the original SCA XMLs. Referring again to FIGS. 6 and 7, in forming the DMD structure 322, the DMD 930 pulls in the 0 to 1 associated Deployment Platform Descriptor (PDD) 932, at least one SPD 908, from 0 to 1 SCD 910, and, from 0 to N PRF 926.

As shown in FIG. 7 (and as also included in the computer program listing appendix), the exemplary DMD structure 320 includes as elements:

```
id : string [1]
props : Properties[1]
services : ServiceTypeSeq[1]
channels : ChannelTypeSeq[1]
name : string[1]
```

As noted above, each of the elements of the DMD structure 322 will be readily understood by one of skill in the art when viewed in connection with the aforementioned, incorporated-by-reference SCA Specification and the included computer program listing appendix. As with the DCD structure 320, the DMD structure 322 advantageously does not include or require elements that are unnecessary for deployment and/or that are merely informational, and, in accordance with at least one embodiment of the invention, includes only elements required for deployment. Note that the embodiment of the invention that include the aforementioned CORBA structures are applicable to virtually all SCA extensions, even those not illustrated with particularity in this patent application.

Figure 8:
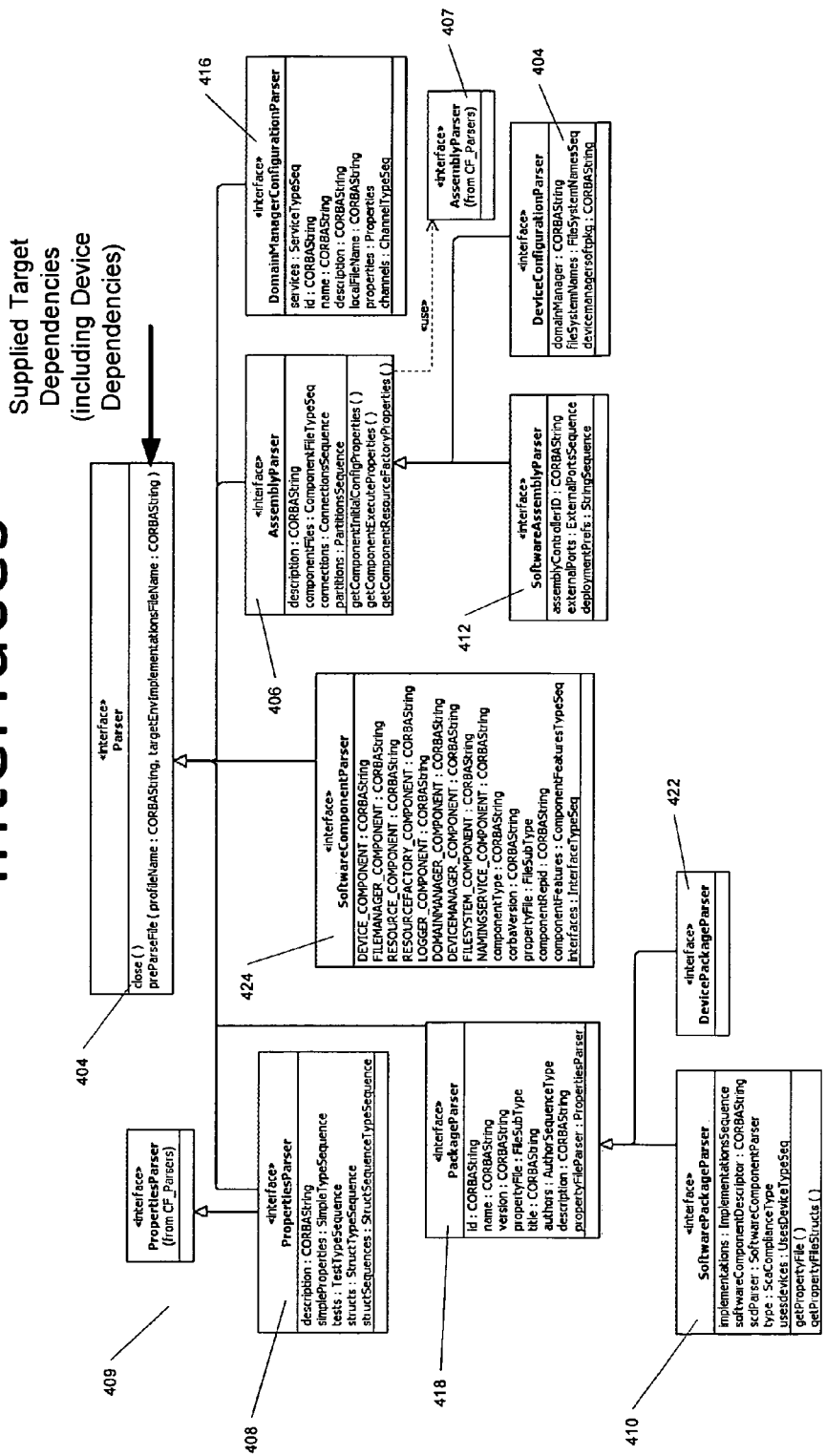
FIG. 8 is a second UML class diagram illustrating the CF PreParsers CORBA Module interfaces, in accordance with one embodiment of the invention.

Referring more particularly to FIG. 7, this figure includes a first UML class diagram 300 illustrating the optimized CF_Parsers CORBA module interfaces and structures, including various CORBA elements used in their definitions, and provides an overview of the interface relationships, in accordance with one embodiment of the invention. In particular, the first UML class diagram 300 of FIG. 7 illustrates interface, classes and relationships related to the parsing activities of the UML Sequence chart of FIG. 10B, described later herein. In addition, FIG. 8 is a second UML class diagram 400 illustrating the CF_PreParsers CORBA Module interfaces, including interfaces, CORBA elements, CORBA constants, and CORBA sequences, used in connection with preparsing, in accordance with one embodiment of the invention. That is, the second UML class diagram 400 of FIG. 8 illustrates interfaces and relationships used during the preparsing activities of the UML Sequence chart of FIG. 9B, described later herein (these activities also include creation of the aforementioned SAD structure 318, DCD structure 320, and DMD structure 322). The CF_PreParsers 114 is based upon interfaces and types from the optimized CF_Parsers 110, so compatible types and interfaces are defined once. This allows the encoding and decoding to be using the same types for SAD, DCD, and DMD.

Referring briefly to FIG. 7, at a high level, in this first UML diagram 300, the CORBA module interfaces include a Parser interface 304, an AssemblyParser interface 306, a PropertiesParser interface 308, a SoftwarePackageParser interface 310, a SoftwareAssemblyParser interface 312, a DeviceConfigurationParser interface 314, and a DomainManagerConfigurationParser interface 316. The UML class diagram 300 of FIG. 7 also illustrates the aforementioned CORBA structures that define the attributes of the aforementioned Software Assembly Descriptor (SAD) structure 318, Device Configuration Descriptor structure (DCD) structure 320, and Domain Manager Configuration Descriptor (DMD) structure 322. The AssemblyParser interface 306 and the DomainManagerConfigurationParser 316 interface each inherit from the Parser interface 304. The SoftwareAssemblyParser interface 312 and the DeviceConfigurationParser interface 314 each inherit from the AssemblyParser interface 306. The AssemblyParser interface 306 has a dependency on the PropertiesParser interface 308 and the SoftwarePackageParser interface 310. These types of dependencies can be used in building up Partitions. The DCD CORBA structure 320 and the SAD CORBA structure 318 each uses information from the AssemblyParser interface 306.

In addition, as will be appreciated by those of skill in the art, the first UML class diagram 300 of FIG. 7 updates and modifies in several places the middleware layer parser interfaces definitions shown in FIG. 4 of the aforementioned '020 patent in several ways. For example, the optimized CF_Parsers_IDL 110 of FIG. 4 of the instant application advantageously only has the bare minimum behavior needed for decoding the SAD, DCD, and DMD and retrieving the information, whereas the CF_PreParsers 114 (of FIG. 8) includes all the information needed to parse the various XML files. Further, one of skill in the art will recognize that because details regarding at least some of the elements within the interfaces are explained further in the aforementioned, incorporated-by-reference SCA specification, these details are not repeated here in every instance, for purposes of clarity. In addition, details and implementation of the interfaces and elements shown in FIGS. 7 and 8 is further illustrated in the files included with the computer program listing appendix that form part of this application.

Referring briefly to FIG. 8, at a high level, in the second UML diagram 400 of FIG. 8, the CF_PreParsers CORBA Module Interfaces include a Parser interface 404, an AssemblyParser interface 406, a CF_Parsers::AssemblyParser interface 407 (which is the same as the Assembly Parser interface 306 of FIG. 7), a PropertiesParser interface 408, a CF_Parsers::PropertiesParser interface 409 (which is the same as the PropertiesParser interface 308 of FIG. 7), a SoftwarePackageParser interface 410, a SoftwareAssemblyParser interface 412, a DomainManagerConfigurationParser interface 414, a DomainManagerConfigurationParser interface 416, a PackageParser interface 418, a DevicePackageParser interface 422, and a SoftwareComponentParser 424.

In FIG. 8, the AssemblyParser interface 410, the PropertiesParser interface 408, the SoftwareComponentParserinterface 424, the PackageParser interface 418 and the DomainManagerConfigurationParser 416 each inherit from the Parser interface 404 (each of these elements is explained further below). The SoftwareAssemblyParser interface 412 and the DeviceConfigurationParser interface 414 each inherit from the AssemblyParser interface 406. The SoftwarePackageParser interface 410 and the DevicePackageParser interface 422 each inherit from the PackageParser interface 418.

As illustrated in FIG. 8, the preParseFile of the Parser interface 404, in accordance with one embodiment of the invention, includes additional parameters for the Target Environment and Device allocation property definitions (e.g., the supplied target dependencies, including device dependencies). Further, the Parser interface 404 of FIG. 8 (CF_PreParsers/Offline Environment) is somewhat similar to the Parser interface 304 of FIG. 7 (CF_Parsers/Embedded Environment), but is adapted, of course, for the Offline Environment and, for example, can use different methods. For example, in FIG. 7, the Parser interface 304 defines the common attributes and operations for all CORBA parsers. The parseFile method used in the Parser interface 304 of FIG. 7 parses the input file and verifies that the input file is well formed and valid encoded file. In FIG. 8, the PreParseFile method of the Parser interface 404 of FIG. 8 calls the offline XML parser (e.g., Xerces parser 206) to parse the SCA XML files 214 (e.g., so as to be used during formation of the aforementioned CORBA structures).

Similarly, the AssemblyParser interface 306 of FIG. 7 (CF_Parsers, Embedded Environment) is somewhat similar to the AssemblyParser interface 406 of FIG. 8 (CF_PreParsers, Target Environment), but each AssemblyParser interface is adapted for each environment. For example, the AssemblyParser interface 306 of FIGS. 7 and 406 of FIG. 8 each contains common operations and attributes for retrieving common elements that an assembly type (e.g., DCD and SAD) file consist of and has common elements such as partitions and connections elements. In FIG. 8, the AssemblyParser interface 406 includes further methods and also uses definitions from the AssemblyParser interface 406 of the Embedded Environment of FIG. 7 (e.g., via the CF_Parsers::AssemblyParser interface 407). That is, the AssemblyParser interface 406 of FIG. 8 depends on the CF_Parsers::AssemblyParser interface 407, where the AssemblyParser interface 306 is a member function of the CF_Parser class of FIG. 7.

The AssemblyParser interface 406 of FIG. 8 includes several methods/operations, all further described in the included CF_PreParsers_IDL.doc in the Computer Program Appendix. The componentInitialConfigProperties operation returns the set of configuration properties that are used for the initial configuration of this component after execution. The properties returned have been converted to the proper CORBA types from their string types (found in XML). The conversion is based on the type attribute defined in the SimpleType. The getComponentExecuteProperties operation returns the set of execute properties that are used for executing a component. The properties returned have been converted to the proper CORBA types from their string types (found in XML). The conversion is based on the type attribute defined in the SimpleType.

The getComponentResourceFactoryProperties operation returns the set of properties associated with an instance of the resource and are to be sent to the resourceFactory when the instance is created. The properties returned have been converted to the proper CORBA types from their string types (found in XML). The conversion is based on the type attribute defined in the SimpleType. This operation adheres to the rules specified in SCA version 2.2/2.2.2, section D.6.1.3.3, concerning precedence order.

Similarly, the PropertiesParser 308 of FIG. 7 and the PropertiesParser 408 of FIG. 8 are somewhat similar, but each is adapted for the respective environment, i.e., the Embedded Environment for the PropertiesParser 308 of FIG. 7 and the Offline Environment for the PropertiesParser 408 of FIG. 8. The PropertiesParser 308, 408 of FIGS. 7 and 8 is an interface for a property file (.prf) parser. A property file can be referenced by a Software Package Descriptor 908 (SPD; see FIG. 6) or Software Component Descriptor 910 (SCD; see FIG. 6) XML file or a Device Package Descriptor 924 (DPD; see FIG. 6) XML file. The SPD describes implementation(s) of a specific component. The SCD describes as CORBA-capable software component and its interfaces. The Device Package Descriptor identifies a class of device. The PropertiesParser interface 408 of FIG. 8 inherits from the CF_Parsers::PropertiesParser interface 409 (i.e., uses definitions from the PropertiesParser 304 of the Embedded Environment of FIG. 7). A property file can be referenced by an assembly, component, or component instantiation and contains property elements.

The SoftwarePackageParser interface 310 of FIG. 7 and of FIG. 8 is part of an XML parser interface for a Software Package Descriptor (SPD) parser. The SPD is used at deployment time to load and execute an SCA compliant component and its various implementations.

Referring again to FIGS. 7 and 8, the SoftwareAssemblyParser interface 312 (of FIG. 7) and 412 (of FIG. 8) defines the operations to parse and retrieve information from a Software Assembly Descriptor (SAD) XML file that conforms to the SAD DTD. As with the other interfaces that are present in both the Offline and Embedded environments, each SoftwareAssemblyParser interface 312 (of FIG. 7) and 412 (of FIG. 8) is tailored to the environment (Embedded or Offline) in which it is implemented. The SAD describes the deployment characteristics and connectivity of components. The SoftwareAssemblyParser interface 312/412 extends the AssemblyParser interface 306 by adding specific behavior and types for a SAD DTD, including several attributes. In FIG. 7, the SoftwareAssemblyParser interface 312 is used by the optimized CF_Parser 110 to parse the data in a SAD CDR file created by the Optimized CF_PreParsers 114. The readonly assemblyControllerId attribute corresponds to the SAD DTD assemblycontroller element within the SAD file. The readonly externalPorts attribute corresponds to the SAD DTD externalports element with the SAD file. This attribute is an optional element within the SAD DTD, therefore an empty set is valid.

In addition, as noted below, for the SoftwareAssemblyParser interface 312 of FIG. 7, (like the DomainManagerConfigurationParser interface 316, described below), the local interface can have a compiler directive if needed. CORBA inherently has a local interface mechanism. The Optimized CF_Parser 110 described herein is intended to reside within the SDR system 20 (FIG. 1), but, the Optimized CF_Parsers 110 can be local or remote (i.e., non-local), that is, the Optimized CF_Parsers 110 can have local or remote distribute behavior between the client and optimized CF_Parsers 110 components (e.g., between the SDR client 22 and the SDR software component 24). For example, the Optimized CF_Parsers 110, in one embodiment of the invention can be co-located with an SDR client (e.g., SDR client 22 of FIG. 1) that is calling the parsing behavior. Being "collocated" or "local" means that the SDR client 22 and the optimized CF_Parsers 110 are in the same operating system process/partition. If that is the case, then the Optimized CF_Parsers 110 has local behavior. If, however, the SDR client and the Optimized CF_Parsers 110 are remote (such as when the Optimized CF_Parsers 110 is in a different operating system process/partition than the SDR client 22), then the optimized CF_Parsers 110 behavior is said to be remote service and client's CF_Parsers are marshaled CORBA requests.

Referring to FIGS. 7-8, the DeviceConfigurationParser interface 314 (FIG. 7), 414 (FIG. 8) defines the operations to parse and retrieve information from a Device Configuration Descriptor (DCD) file. The DCD 922 identifies components that will initially start on a device, information about the devices associated with a device manager and how to find the domain manager, as well as the configuration information for a device. As with the other interfaces that are present in both the Offline and Embedded environments, each DeviceConfigurationParser interface 314 (of FIG. 7) and 414 (of FIG. 8) is tailored to the environment (Embedded or Offline) in which it is implemented. For example, in FIG. 8, the DeviceConfigurationParser interface 414 extends the AssemblyParser interface 406 and Parser interface 404 by adding specific behavior and types for a DCD DTD. In addition, in the Embedded environment of FIG. 7, the DeviceConfigurationParser 314 is used by the optimized CF_Parsers 110 to parse the data in a DCD CDR file created by the optimized CF_PreParsers 114. The domainmanager element of the DeviceConfigurationParser interface 414 of FIG. 8 indicates how to obtain the CF::DomainManager object reference. The filesystemames element of the DeviceConfigurationParser interface 414 of FIG. 8 indicates the mounted file system names for CF::DeviceManager's FileManager. The devicemanagersoftpkg element of the DeviceConfigurationParser interface 414 of FIG. 8 refers to the SPD 908 for the CF DeviceManager.

In addition, in one embodiment, the DeviceConfigurationParser interface 314/414 can include an optional (not illustrated in FIG. 7 or 8), read-only, connections attribute, which the attribute corresponds to the DCD DTD connections element within the DCD file 922. This is illustrated, indirectly in FIG. 8 by inheritance: the DeviceConfigurationParser interface 414 inherits from the Assembly Parser interface 406, which inherits from CF_Parsers::AssemblyParser 407. This attribute is an optional element within the DCD DTD, therefore an empty set is valid. The connections attribute is intended to provide the connection map between components in the assembly.

Still referring to FIGS. 7-8, the DomainManagerConfigurationParser interface 316 (FIG. 7) and 416 (FIG. 8) defines the operations to parse and retrieve information from a DomainManager Configuration Descriptor (DMD) XML file 930 that conforms to the DMD DTD. As with the other interfaces that are present in both the Offline and Embedded environments, each DomainManagerConfigurationParser interface 316 (of FIG. 7) and 416 (of FIG. 8) is tailored to the environment (Embedded or Offline) in which it is implemented. The DomainManagerConfigurationParser interface 316/416 extends the Parser interface 304/404 by adding specific behavior and types for a DMD DTD. The services type of the DomainmanagerConfigurationParser interface 316 corresponds to the service element definition in the DMD DTD. It's used by the CF DomainManager to determine which service (Log, etc.) instances to use; it makes use of the service element in the DTD.

Referring to FIG. 8, the PackageParser interface 418 contains operations and attributes for retrieving common elements that an XML package type (e.g., Device Package Descriptor (DPD) 924, Software Package Descriptor (SPD) file 908) consists of, such as author and title elements. The DPD 924 identifies a class of device.

Other embodiments can, of course, include additional interfaces and classes. For example, in one embodiment there is a PackageParser interface 412 that contains operations and attributes for retrieving common elements that an XML package type (e.g., DPD, SPD) file consists of, such as author and title elements. The SoftwarePackageParser 310 inherits from the PackageParser 412, and the SoftwarePackageParser 310 parsers and SPD 908.

As noted above, FIGS. 7 and 8 also illustrate how an IDL Compiler directive can control whether the CF parser IDL interface is local or not. The ability to provide a local interface in the optimized CF_Parsers 110 is optional, and providing a local interface for the optimized CF_Parsers 110 is done for certain interfaces in cases where the Device Manager is not collocated with the Domain Manager. For example, in the exemplary embodiment of FIG. 7, an optional new constraint, namely the islocal=True/False, is added to each of the SoftwareAssemblyParser interface 312 and DomainManagerConfigurationParser interface 316. This UML constraint is controlled by an IDL Compiler Directive, which controls whether the particular interface is local or not. In FIG. 8, the constraint is Local is set to TRUE. The local interface is controlled by compile directive:

```
#ifdef CORBA_LOCAL
   local
#endif
```

If the CORBA_LOCAL symbol is defined then local is used. The IDL compiler option allows for a symbol to be defined during compilation. That is, the compile directives allows choices when compiling the IDL, so generated code can be generated differently depending on the CORBA_LOCAL being defined or not.

For example, in one embodiment, the local interface feature is implemented via a modification to the CF_Parsers at IDL compile time. In such an embodiment, the SCA domain profile includes a set of SCA XML files and corresponding CORBA encoded data files (CDRs), the set of CORBA CDRs including a Software Assembly Descriptor (SAD) CDR, a Domain Manager Configuration Descriptor (DMD) CDR and a Device Configuration Descriptor (DCD) CDR. Each CDR corresponds to a respective set of preparsed SAD, DMD, and DCD XML files, wherein each respective set of preparsed SAD, DMD, and DCD XML files is, advantageously, further configured to be substantially free of elements or operations that are not required for deployment in the CF. The CF_Parsers is in operable communication with the set of CORBA encoded data files and with a client. The CF_Parsers configured to convert, upon receiving request from the client, each respective SAD, DMD, and DCD CDR to a corresponding respective SAD, DMD, and DCD CORBA structure type that is usable in the CF. In the CF_Parsers, a selectable local interface is included for the DeviceManagerParser interface but can also be extended to other Parser interfaces. This selectable local interface is configured to be selectable, at the time of compiling, to operate in a local operational mode when the CF_Parsers, Domain Manager and Device Manager clients are in either the same operating system process or the same operating system partition. In addition, the selectable local interface is configured to be selectable, at the time of compiling, to operate in a remote distributive operational mode in one of the following two situations: (a) when the CF_Parsers and the clients are in different operating system processes from each other; and (b) when the CF_Parsers and the client are in different operating system partitions from each other.

Those of skill in the art will note that the aforementioned code listings in the incorporated-by-reference CD of computer program listings provide further details as to the particulars of the types, exceptions, input parameters, and methods of the various interfaces shown in the UML diagrams 300 and 400 of FIGS. 6 and 7, respectively, as implemented in accordance with one or more exemplary and non-limiting embodiments of the invention, which listings will be readily understood by one of skill in the art.

Figure 9A:
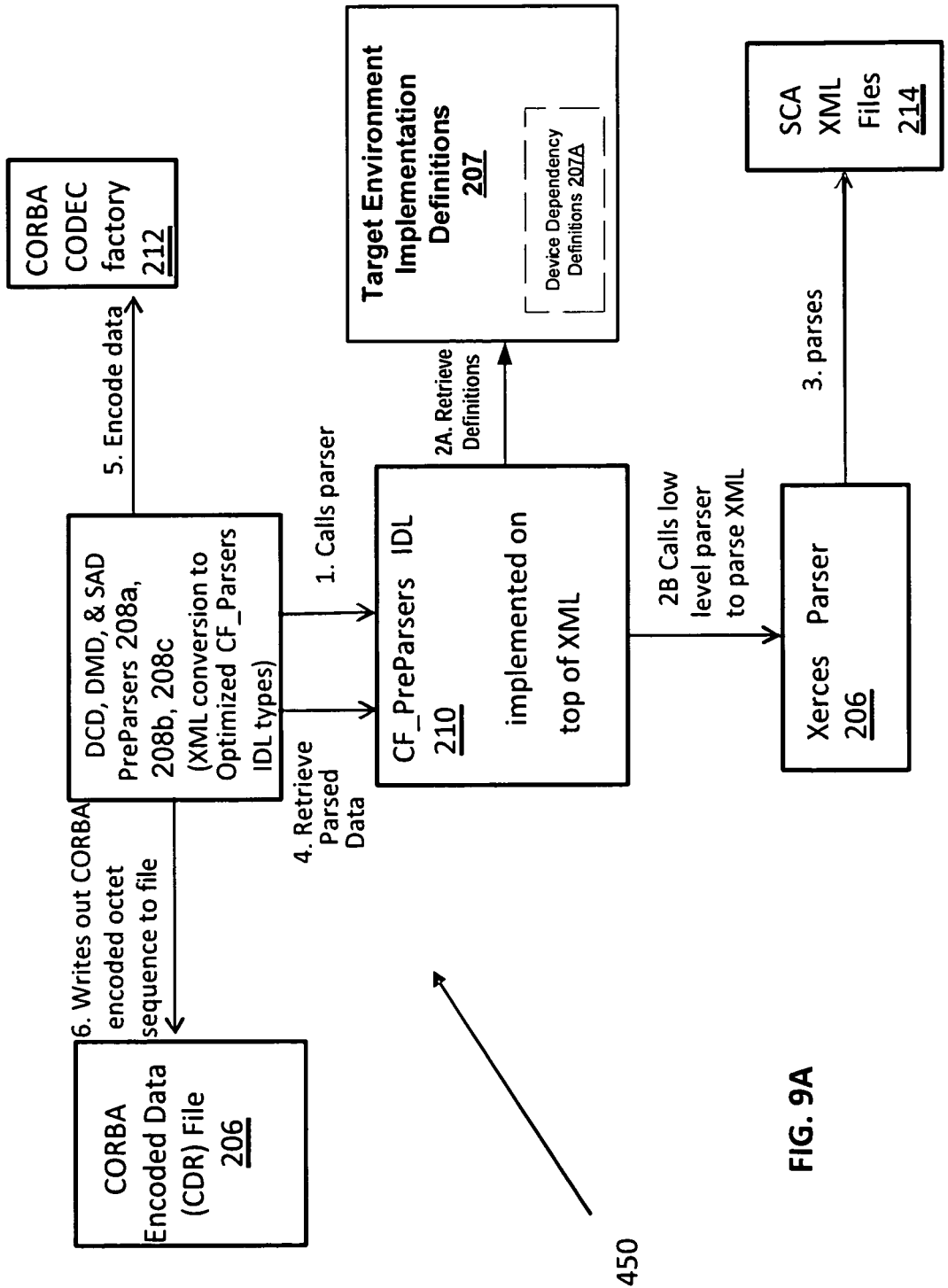
FIG. 9A is a block diagram illustrating interaction between the components of FIG. 4 during operation of the Offline CF_PreParsers tool, including retrieving Target Environment Implementation Definitions, in accordance with one embodiment of the invention.
Figure 9B:
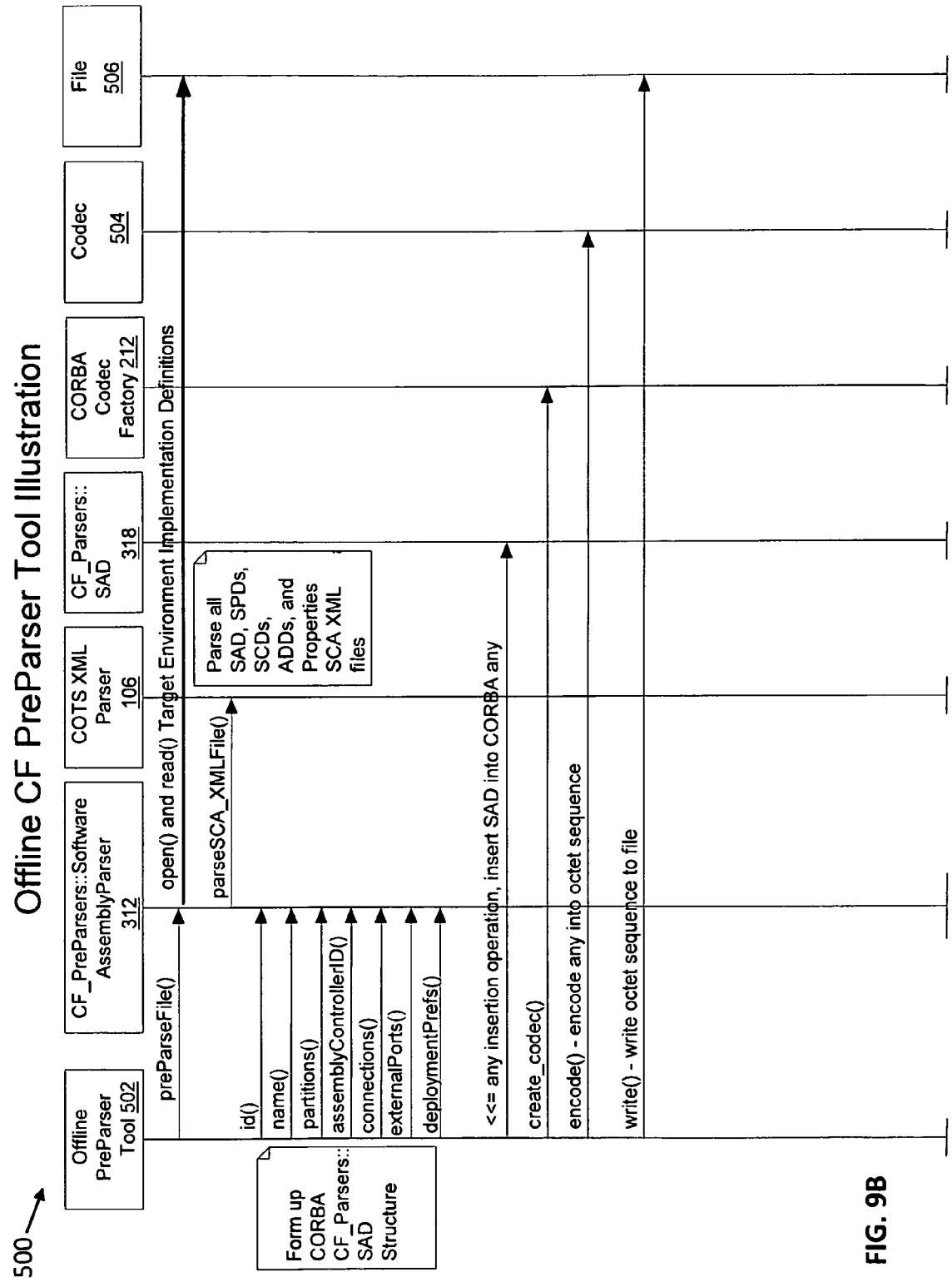
FIG. 9B is a first UML sequence diagram illustrating the operation of Offline CF PreParsers tool, including instruction sequences embodying the block diagram of FIG. 9A, in accordance with one embodiment of the invention.
Figure 10A:
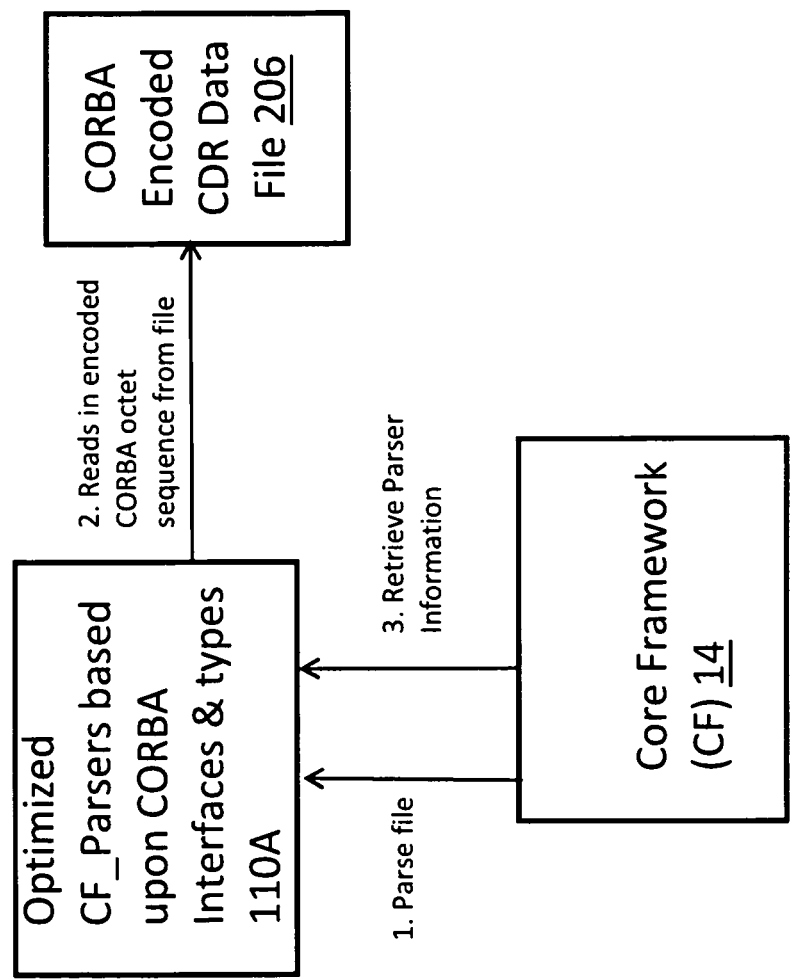
FIG. 10A is a block diagram illustrating, in the Target Embedded Environment, interaction between the components of FIG. 4 during operation of the Embedded Optimize CF_Parsers, including reading in and decoding of CORBA CDR files, in accordance with one embodiment of the invention
Figure 10B:
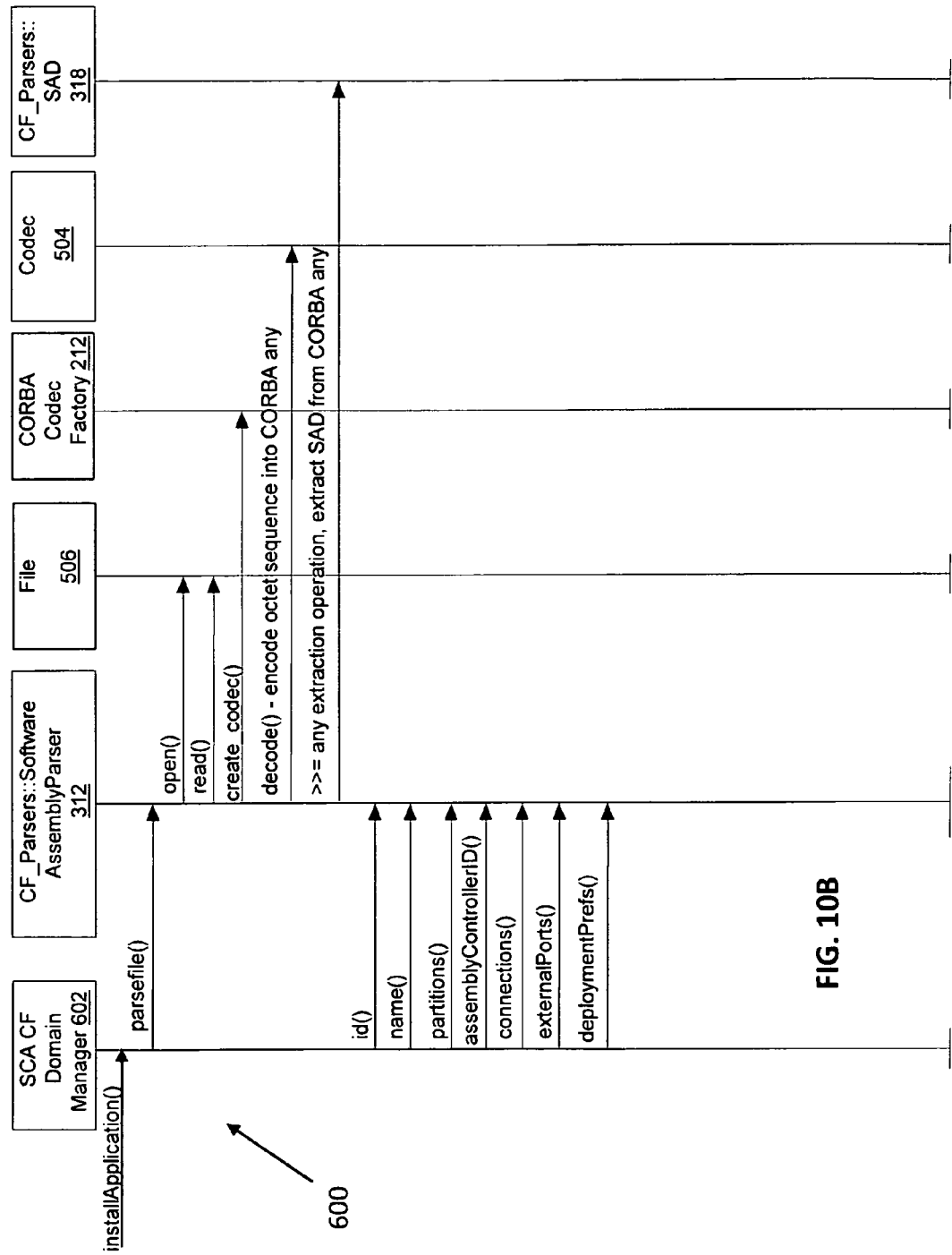
FIG. 10B is a second UML sequence diagram illustrating the optimized CF_Parsers Install application Illustration, including instruction sequences embodying the block diagram of FIG. 10A, in accordance with one embodiment of the invention.
Figure 11:
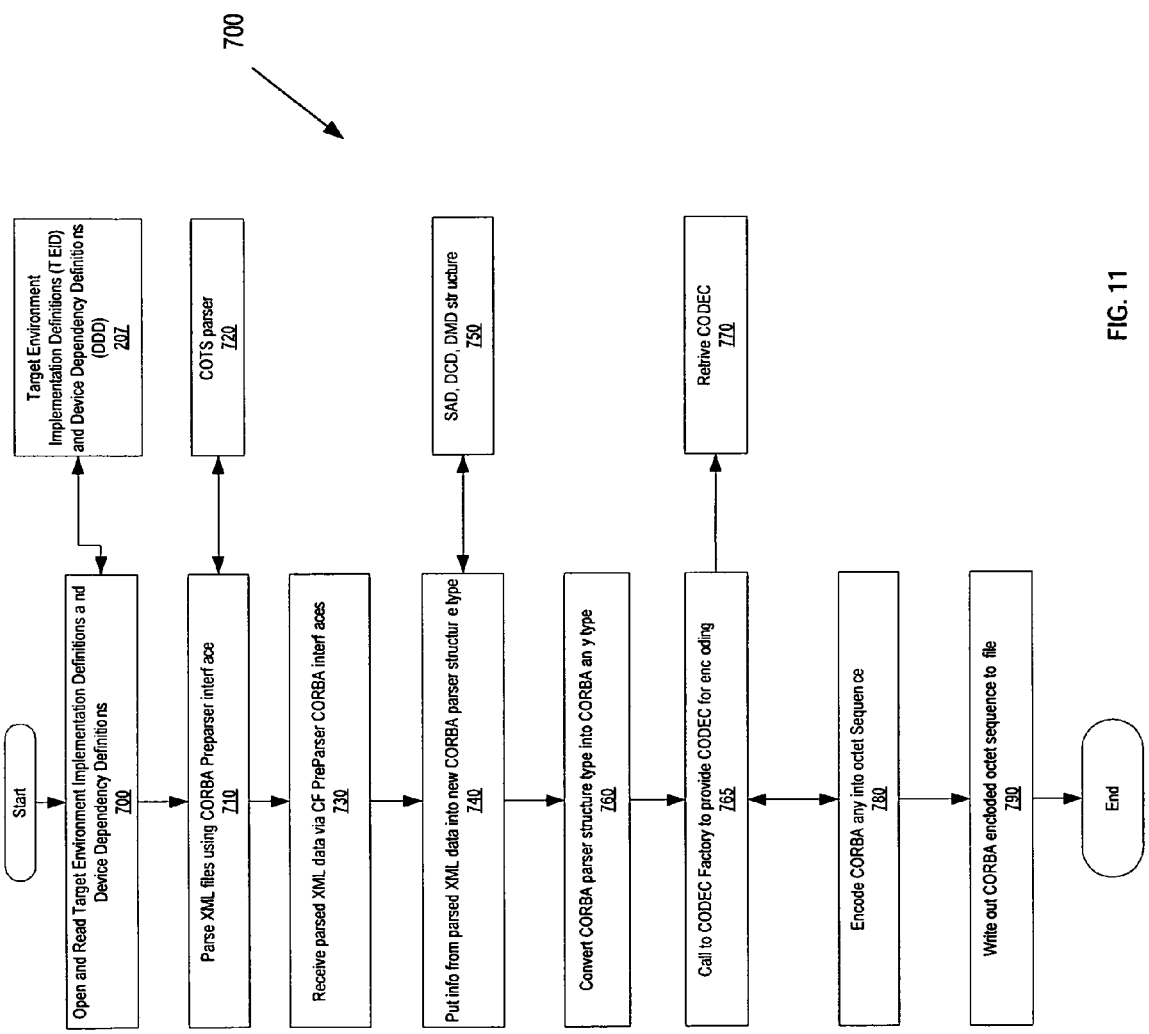
FIG. 11 is a first flow chart illustrating a portion of the offline method of operation of FIGS. 9A and 9B, in accordance with one embodiment of the invention.
Figure 12:
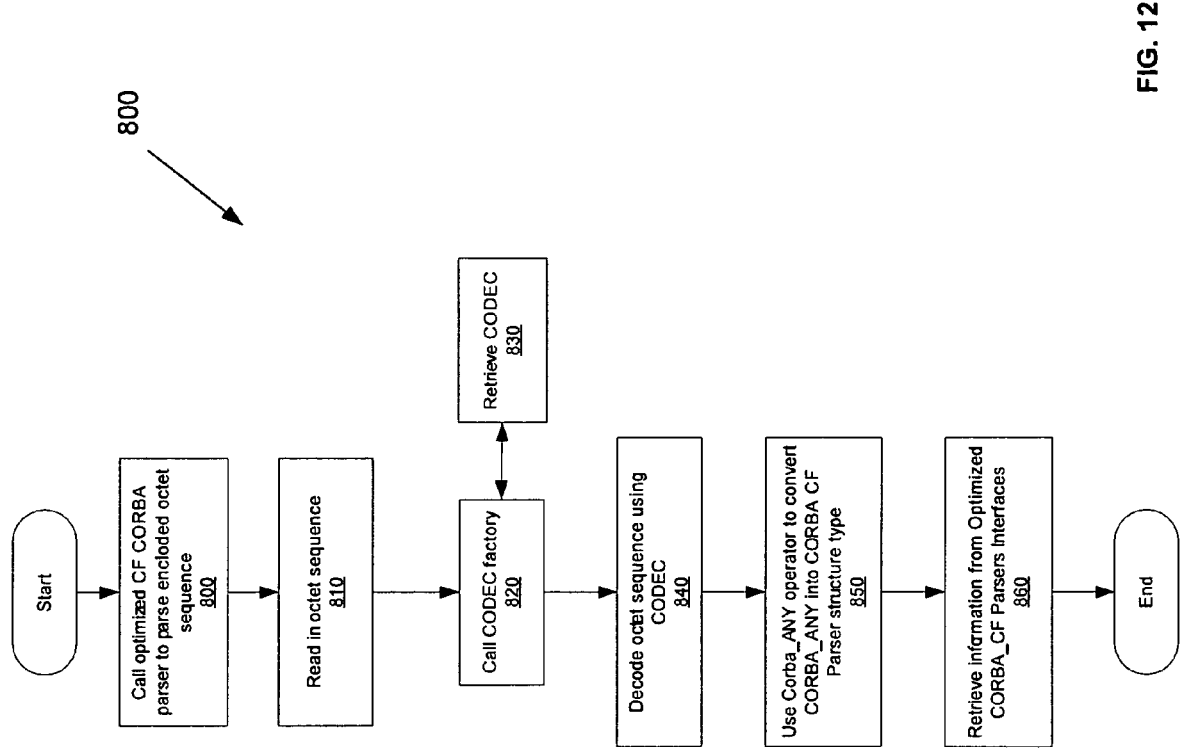
FIG. 12 is a second flow chart illustrating a portion of the embedded method of operation of FIGS. 10A and 10B, in accordance with one embodiment of the invention.

FIG. 9A is a block diagram 450 illustrating interaction between components of FIGS. 4 and 5A during operation of the Offline CF_PreParsers tool 114, including preparsing of SCA XML files 214, creation of CORBA structures and the CORBA Encoded Data (CDR) file 206, and retrieval of Target Environment Implementation Definitions (TEID) 207 (which includes Device Dependency Definitions 207A) in accordance with one embodiment of the invention. FIG. 9B is a first UML sequence diagram 500 that further illustrates operation of the Offline CF PreParsers tool 114, in accordance with one embodiment of the invention. FIG. 10A is a block diagram illustrating interaction between components of FIGS. 4 and 5A during operation of the Embedded CF_Parsers tool 110, in accordance with one embodiment of the invention. FIG. 10B is a second UML sequence diagram 600 that further illustrates operation of the Embedded CF Parsers tool 110, in accordance with one embodiment of the invention. FIGS. 11 and 12 are first and second flow charts illustrating, respectively, first and second methods of operation in accordance with one embodiment of the invention, where the method of FIG. 11 embodies the signal flow and sequences of FIGS. 9A-9B, and where the method of FIG. 12 embodies the signal flow and sequences of FIGS. 10A-10B. FIGS. 9A-12 are discussed in greater detail below.

Although the following discussion uses the example of the SAD structure 318, the operations and signal flow discussed is, of course, applicable to the other CORBA structures (i.e., the DCD structure 320 and the DMD structure 322), as will appreciated by those of skill in the art.

Referring now to FIGS. 5A-7, 9A, 9B, and 11, per "step 1" of FIG. 9A, the OfflinePreParsers Tool 502 of FIG. 9B (which includes, for example, the DCD, DMD, and SAD PreParsers 208a, 208b, 208c) sends a message, preParseFile, to the CF_PreParsers::SoftwareAssemblyParser 312 to Parse XML files using existing CORBA PreParsers interface (step 710 of FIG. 11) that is on top of the COTS XML Parser, including parsing all SAD, SPDs, SCDs, and Properties SCA XML files. To accomplish this, the CF_Preparsers::Parser sends a call, preParseFile( ) to open( ) and read( ) the Target Environment Implementation Definitions (TEID) (e.g., step 2A of FIG. 9A and blocks 700, 705 of FIG. 11), and the CF_PreParsers::SoftwareAssemblyParser 312 sends a call, parseSCA_XMLFile( ) to the COTS XML Parser 106 (e.g., step 2B of FIG. 9A, step 720 of FIG. 11). As discussed above, the TEID 207 includes information that tells the CF_Preparser 114 about the target environment, so that the CF_Preparser 114 can determine the device definitions being used and can put the pre-parsed information into the correct format. All SAD, SPDs, ADD, SCD, and Properties SCA XML files 214 are parsed (step 3 of FIG. 9A), in accordance with the TEID 207.

The parsed XML data is received (step 730 of FIG. 11) at the CF_PreParsers CORBA Interfaces (i.e., the interfaces in the UML diagram 500 of FIG. 9B). The information from the parsed XML data is collapsed/converted into a new CORBA parser structure type (step 740), such as a SAD, DCD, and/or DMD structure (step 750), as was discussed above in connection with FIG. 6. The information used to form up the CORBA CF_Parsers structure (which by way of example in FIG. 9B is a SAD structure) is shown in FIG. 9B next to the corresponding UML note (e.g., id( ), name( ), partitions( ), etc.), as was discussed previously above.

Still referring to FIGS. 5A-7. 9A, 9B, and 11, and particularly to FIGS. 9B and 11, the CORBA parser structure type is converted into a CORBA_Any type (step 760), using the generated Any operator that the compiler generates. As is known in the art, a CORBA Any is a container type that can represent any possible basic or constructed type. For example, as shown in FIG. 9B, the Offline PreParsers Tool 502 uses the <<=Any insertion operation to insert the SAD into a CORBA_Any. A CORBA encode operation is done to convert the CORBA_Any into an octet sequence (step 780), using a CODEC 504 obtained (step 770) from a call to the CORBA CODEC FACTORY 212 (step 765). For example, in FIG. 9B, the OfflinePreParsers Tool 508 sends calls create_codec( ) to the CORBA Codec Factory 212 and encode( ) to the CODEC 504 to encode the Any into an octet sequence. Note that each CORBA structure has two CORBA Any operators generated by the IDL compiler for extracting from an Any and placing into an Any. Referring again to FIGS. 5-7. 9A, 9B, and 11, the CORBA encoded octet sequence is written to File 506 (step 5A of FIG. 9A, step 790 of FIG. 11), such as via the Offline PreParsers Tool 502 sending a write( ) call to File 506. The File 506 is, advantageously, in the form of a CORBA encoded data (CDR) file 206. As noted above, this file is accessible to the Embedded CF_Parsers 110.

Referring now to FIGS. 5A-7, 10A, 10B, and 12, (the Optimized CF_Parsers (also referred to as Embedded CF_Parsers) Install Application Illustration), a call is made (step 1 of FIG. 10A, step 800 of FIG. 12) to the optimized CF_Parsers 110A to parse the encoded CORBA file (i.e., the octet sequence written to file in step 790 of FIG. 11). For example, referring to FIG. 10B, this is accomplished, in one embodiment by the SCA CF Domain Manager 602 sending a call parseFile( ) to the CF_Parsers::SoftwareAssemblyParser 312, then the CF:Parsers::SoftwareAssemblyParser sending an open( ) call to the File 506. The octet sequence is read in (step 2 of FIG. 10A, step 810 of FIG. 12), such as via the CF_Parsers::SoftwareAssemblyParser 312 sending a read( ) call to the File 508. A call is made to the CODEC factory 212 to retrieve a CODEC 504 (steps 820, 830 of FIG. 12), such as via the CF_Parsers:SoftwareAssemblyParser 312 parseFile 602 sending a create_codec( ) call to the CORBA CODEC Factory 212. The octet sequence is decoded, advantageously using the CODEC 504, to form the CORBA Any (step 840). For example, this can be accomplished by the CF_Parsers: SoftwareAssemblyParser 602 parseFile sending a decode( ) call to the CODEC 504.

The CORBA Any operator is used to convert the CORBA Any into a CORBA CF_Parsers structure type (step 850). For example, this can be done by the CF_Parsers::SoftwareAssemblyParser 802 calling the Any extraction operation on the CF_Parsers::SAD 318, to extract a given structure type (e.g., SAD structure 318) from the CORBA_Any. The information from the optimized CORBA CF_Parsers Interfaces is then retrieved (step 860), such as id( ), name( ), partitions( ), etc.

Thus, as shown and described in FIGS. 4-12 herein, through the use of CORBA local interfaces, CORBA encoding for CORBA deployment types (SAD, DCD, DMD) and the removal of XML parser, as described herein, more efficient operation can be achieved. Further, as shown and described above, the CORBA CODEC mechanisms are used to implement and SCA system in which, effectively, a CORBA parser replaces the XML parser. The inventors propose that using a CORBA parser to replace the XML parser, as is shown herein for the SCA embodiments, provides significant improvements to any systems where XML parsing is used, including but not limited to SDR systems like the SCA SDR. For example, it is proposed that use of a CORBA parser, as described herein, reduces code size, improves parsing speed, and requires less processing overall.

As those skilled in the art will recognize, the various embodiments invention described herein can be modified to accommodate and/or comply with any many different technologies and standards, including particularly future SCA standards, including but not limited to SCA Next. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It should also be appreciated that the UML diagrams, block diagrams, and flow charts provided herein do not depict the syntax of any particular programming language (although in some instances methods from C++, CORBA IDL and/or Java programming language have been provided by way of example). Rather, the flow diagrams and flow charts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit and scope of the invention.

Figure 2:
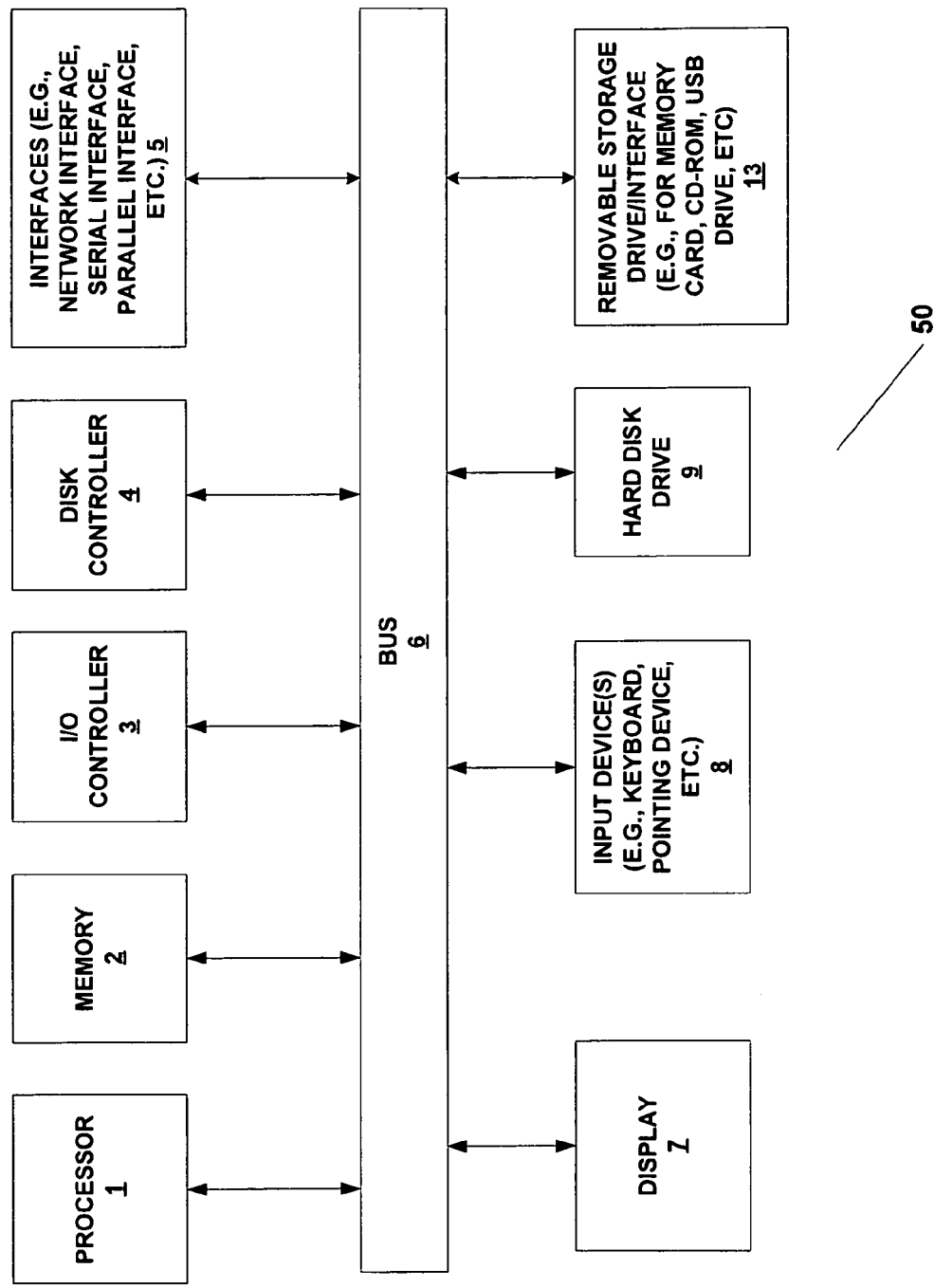
FIG. 2 is a block diagram of a computer system in which at least one embodiment of the present invention can be embodied.

Those skilled in the art will appreciate that computer systems embodying the present invention need not include every element shown in FIG. 2, and that equivalents to each of the elements are intended to be included within the spirit and scope of the invention. For example, the computer system 50 need not include the tape drive 28, and may include other types of drives, such as compact disk read-only memory (CD-ROM) drives, universal serial bus (USB) drives, and any other type of removable media onto which information can be stored. CD-ROM drives can, for example, be used to store some or all of the databases described herein.

Systems and methods in accordance with the invention can be implemented using any type of computer system running any one or more types of operating systems (including, by way of illustration and not limitation, the target embedded environment 202 and Linux Offline environment 204, described further herein). Exemplary types of computer systems on which at least some embodiments of the invention can be embodied include any system or device having a processor (or equivalent processing functionality) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, music playing device, electronic reading device) server, workstation, and interconnected group of computers, as well as any other type of device having a microprocessor installed or embedded thereto, such as a field-programmable gate array (FPGA).

In at least one embodiment of the invention, one or more computer programs, such as those further described herein, define the operational capabilities of the computer system 50. These programs can be loaded into the computer system 50 in many ways, such as via the hard disk drive 64, the floppy disk drive 66, the tape drive 28, a CD-ROM drive, a USB drive, or via the network interface 58 (e.g., wirelessly, via the Internet, etc.) Alternatively, the programs can reside in a permanent memory portion (e.g., a read-only-memory (ROM)) chip) of the main memory 54. In another embodiment, the computer system 50 can include specially designed, dedicated, hard-wired electronic circuits that perform all functions described herein without the need for methods from computer programs.

In at least one embodiment of the present invention, the computer system 50 is networked to other devices, such as in a client-server or peer-to-peer system. The computer system 50 can, for example, be a client system, a server system, or a peer system. In one embodiment, the invention is implemented at the server side and receives and responds to requests from a client, such as a reader application running on a user computer. The computer system can be implemented as part of, controlling, or in operable communication with a terminal, personal computer, mainframe computer, workstation, hand-held device, electronic book, personal digital assistant, peripheral device, notebook computer, a handheld computing device (e.g., a PDA), an Internet appliance, a telephone, an electronic reader device, an SDR, or any other such device connectable to the computer network.

In addition, software embodying the present invention, in one embodiment, resides in an application or other program running on the computer system 50. In at least one embodiment, the present invention is embodied in a computer-readable program medium usable with the general-purpose computer system 50. In at least one embodiment, the present invention is embodied in a data structure stored on a computer or a computer-readable program medium. In addition, in one embodiment, the present invention is embodied in a transmission medium, such as one or more carrier wave signals transmitted between the computer system 50 and another entity, such as another computer system, a server, a wireless network, etc. The present invention also, in an embodiment, is embodied in an application programming interface (API) or a user interface. In addition, the present invention, in one embodiment, is embodied in a data structure.

Further, in describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

The invention claimed is:

1. A preparsers tool for converting Software Communications Architecture (SCA) extensible markup language (XML) files into Common Object Resource Broker Architecture (CORBA) structures usable by an SCA Core Framework (CF), the preparsers tool stored on a non-transitory computer-readable storage medium and configured to operate on a processor remote from the SCA CF, the preparsers tool comprising:

a core framework (CF)_PreParsers interface definition language (IDL) configured to be in operable communication with an XML parser and with at least a first type of preparser;

the first type of preparser in operable communication with the CF_PreParsers IDL, the first type of preparser associated with a first type of descriptor for the SCA CF, the first type of preparser configured to:
call the XML parser to request parsing of a first set of first XML files;
retrieve a first set of target environment implementation definitions (TEID), the TEID defining at least one characteristic of a target environment to which a first CORBA Common Data Representation (CDR) data file is provided;
convert the first parsed set of first XML files into a first CORBA structure type, the first CORBA structure type based at least in part on at least one predetermined type associated with the SCA CF, the conversion based at least in part on the TEID, such that the conversion of the first parsed set of first XML files results in a first CORBA structure having a type and precedence order that is correct for the target environment;
encode the first CORBA structure type into a first CORBA Common Data Representation (CDR) file; and
write the first CORBA CDR to file as a first octet sequence.

2. The preparser tool of claim 1, wherein the TEID is constructed and arranged to enable the preparsers tool to select a target-appropriate implementation from a software package descriptor (SPD), where the target-appropriate implementation corresponds to an implementation element of the SPD that is applicable to the target environment in which the CORBA CDR file is provided.

3. The preparser tool of claim 1, wherein the TEID further comprises a set of device definitions dependencies (DDD), the DDD comprising visible and external device allocation properties.

4. The preparser tool of claim 3, wherein the TEID comprises a software package descriptor (SPD) extensible markup language (XML) file that comprises one set of device definitions for a device used in the target environment.

5. The preparser tool of claim 4, wherein the SPD XML device definitions comprise at least one allocation property for the device.

6. The preparser tool of claim 4, wherein the set of device definitions in the SPD XML file comprise a reference to a Device Implementation, the Device Implementation comprising a reference to a property file describing at least one allocation property for the device.

7. The preparser tool of claim 1, wherein, for a software component being loaded as part of the preparsing performed by the first type of preparser, an instantiation of the software component comprises implementation device dependencies that comprise a single implementation device dependencies list comprising a first part comprising visible device dependencies and a second part comprising external device dependencies.

8. The preparser tool of claim 7, wherein the preparser is further configured to convert the external device dependencies to a proper SCA CF::Properties type by using input device allocation property definitions provided by a TEID property file.

9. The preparser tool of claim 7, wherein the preparser is further configured to convert the visible device dependencies to a proper device allocation type and equality operator by using input device allocation property definitions provided by a TEID property file.

10. The preparser tool of claim 1, wherein, for an application software component implementation being loaded as part of the preparsing performed by the first type of preparser, an instantiation of the application software component comprises implementation software dependencies that are formed into a single precedence order list in order of loading dependency software.

11. The preparser tool of claim 1, wherein, for an application software component implementation being loaded as part of the preparsing performed by the first type of preparser, an instantiation of the application software component comprises an implementation executable software dependency that is converted to a component instantiation element.

12. The preparser tool of claim 1, wherein, for an application software component implementation being loaded as part of the preparsing performed by the first type of preparser, an instantiation of the application software component comprises deployment dependencies that are merged together into one implementation device dependencies list that is separated into a first portion comprising visible device dependencies and a second portion comprising external device dependencies.

13. The preparser tool of claim 12, wherein, for the application software component implementation being loaded as part of the preparsing performed by the first type of preparser, the first type of preparser is further configured to convert the component instantiation's deployment dependencies external device dependencies to a proper SCA CF::Properties type by using input device allocation property definitions provided by a TEID property file.

14. The preparser tool of claim 12, wherein, for the application software component implementation being loaded as part of the preparsing preformed by the first type of preparser, the first type of preparser is further configured to convert the component instantiation's deployment dependencies visible device dependencies to a proper device allocation type and equality operator by using input device allocation property definitions provided by a TEID property file.

15. The preparser tool of claim 1, wherein, for an application software component being loaded as part of the preparsing performed by the first type of preparser, an instantiation of the application software component comprises implementation uses device dependencies that are separated into 2 parts: visible device dependencies and external device dependencies.

16. The preparser tool of claim 15, wherein the first type of preparser is further configured to convert the implementation's usesdevice external device dependencies to a proper SCA CF::Properties type by using provided input device allocation property definitions provided by a TEID property file.

17. The preparser tool of claim 15, wherein the first type of preparser is further configured to convert the implementation's usesdevice visible device dependencies to a proper device allocation type and equality operator by using provided input device allocation property definitions provided by a TEID property file.

18. A method of preparsing Software Communications Architecture (SCA) extensible markup language (XML) files that are converted into Common Object Resource Broker Architecture (CORBA) structures usable by an SCA Core Framework (CF), the preparsing method configured to operate on a processor remote from the SCA CF, the preparsing method comprising:
   providing a core framework (CF)_PreParsers interface definition language (IDL) configured to be in operable communication with an XML parser and with at least a first type of preparser;
   providing the first type of preparser, which is in operable communication with the CF_PreParsers IDL, the first type of preparser associated with a first type of descriptor for the SCA CF;
   calling the XML parser to request parsing of a first set of first XML files;
   retrieving a first set of target environment implementation definitions (TEID), the TEID defining at least one characteristic of a target environment to which a first CORBA Common Data Representation (CDR) data file is provided;
   converting the first parsed set of first XML files into a first CORBA structure type, the first CORBA structure type based at least in part on at least one predetermined type associated with the SCA CF, the conversion based at least in part on the TEID, such that the conversion of the first parsed set of first XML files results in a first CORBA structure having a type and precedence order that is correct for the target environment;
   encoding the first CORBA structure type into a first CORBA Common Data Representation (CDR) file; and
   writing the first CORBA CDR to file as a first octet sequence.

19. The method of claim 18, further comprising:
   merging together, for each component in the target environment, at least one of the:
   (a) component instantiation implementation software device dependencies;
   (b) component instantiation implementation usesdevice dependencies; and
   (c) component instantiation implementation deployment dependencies;

into an implementation device dependencies list having a first part comprising visible device dependencies and a second part comprising external device dependencies;

converting the external device dependencies to a proper SCA CF::Properties type by using input device allocation property definitions provided by a TEID property file; and converting the visible device dependencies to a proper device allocation type and equality operator by using input device allocation property definitions provided by the TEID property file.

20. A preparser system for converting for converting Software Communications Architecture (SCA) XML files into Common Object Resource Broker Architecture (CORBA) structures usable by an SCA Core Framework (CF), the preparsing system configured to run on a processor implemented on a computer system in operable communication with and remote from the SCA CF, the preparsing system comprising:

a non-transitory computer-readable storage medium storing therein computer-readable code usable by a processor;

a processor in operable communication with the non-transitory computer readable storage medium, the processor configured to run the computer-readable code so as to:

provide a core framework (CF)_PreParsers interface definition language (IDL) configured to be in operable communication with an XML parser and with at least a first type of preparser;

provide the first type of preparser in operable communication with the CF_PreParsers IDL, the first type of preparser associated with a first type of descriptor for the SCA CF;

call the XML parser to request parsing of a first set of first XML files;

retrieve a first set of target environment implementation definitions (TEID), the TEID defining at least one characteristic of a target environment to which a first CORBA Common Data Representation (CDR) data file is provided;

merge together, for each component in the target environment, at least one of the:

(a) component instantiation implementation software device dependencies;

(b) component instantiation implementation usesdevice dependencies; and (c) component instantiation implementation deployment dependencies, into an implementation device dependencies list having a first part comprising visible device dependencies and a second part comprising external device dependencies;

convert the external device dependencies to a proper SCA CF::Properties type by using input device allocation property definitions provided by a TEID property file;

convert the visible device dependencies to a proper device allocation type and equality operator by using the provided input device allocation property definitions provided by the TEID property file;

convert the first parsed set of first files into a first CORBA structure type, the first CORBA structure type based at least in part on at least one predetermined type associated with the SCA CF, the conversion based at least in part on the TEID, such that the conversion of the first parsed set of first XML files results in a first CORBA structure having a type and precedence order that is correct for the target environment;

encode the first CORM structure type into a first CORBA Common Data Representation (CDR) file; and write the first CORBA CDR to file as a first octet sequence.

* * * * *